US012645300B2

(12) United States Patent
Fu et al.

(10) Patent No.:  US 12,645,300 B2
(45) Date of Patent:        Jun. 2, 2026

(54) SURFACE ELECTRICAL NERVE STIMULATION DELIVERED AS HAPTIC FEEDBACK TO CAUSE A USER TO EXPERIENCE NATURAL SENSATION

(71) Applicants:Case Western Reserve University, Cleveland, OH (US); The United States Government as Represented by The Department of Veteran Affairs, Washington, DC (US)

(72) Inventors: Michael J Fu, Washington, DC (US); Dustin Tyler, Cleveland, OH (US); Christian Zorman, Cleveland, OH (US); Nina Sokol, Cleveland, OH (US); Mehmet Akif Gormez, Cleveland, OH (US); Luis Mesias Flores, Washington, DC (US); Nathaniel Makowski, Washington, DC (US); Emily Graczyk, Cleveland, OH (US)

(73) Assignees: CASE WESTERN RESERVE UNIVERSITY, Cleveland, OH (US); THE UNITED STATES GOVERNMENT AS REPRESENTED BY THE DEPARTMENT OF VETERAN AFFAIRS, Washington, DC (US)

( * ) Notice: Subject to any disclaimer, the term of this patent is extended or adjusted under 35 U.S.C. 154(b) by 0 days.

(21) Appl. No.: 18/874,789

(22) PCT Filed: Jun. 12, 2023

(86) PCT No.: PCT/US2023/025046
§ 371 (c)(1),
(2) Date: Dec. 13, 2024

(87) PCT Pub. No.: WO2023/244529
PCT Pub. Date: Dec. 21, 2023

(65) Prior Publication Data
US 2025/0377727 A1      Dec. 11, 2025
Related U.S. Application Data

(60) Provisional application No. 63/394,319, filed on Aug. 2, 2022, provisional application No. 63/352,654, filed on Jun. 16, 2022.

(51) Int. Cl.
*G06F 3/01*              (2006.01)

(52) U.S. Cl.
CPC .................................... *G06F 3/016* (2013.01)

(58) Field of Classification Search
CPC .......... G06F 3/016; G06F 3/014; G06F 3/015; G06F 3/011; A61B 5/6824; A61B 5/6825;
(Continued)

(56) References Cited

U.S. PATENT DOCUMENTS 11,199,903 B1 * 12/2021 Jung ....................... G06F 3/011
2020/0237031 A1    7/2020 Daniels et al.
(Continued)

OTHER PUBLICATIONS

Canadian Application No. 3,259,115, Office Action dated Dec. 15, 2025.

*Primary Examiner* — Rodney Amadiz
(74) *Attorney, Agent, or Firm* — Tarolli, Sundheim, Covell & Tummino LLP

(57)                ABSTRACT

A system that can deliver haptic feedback by applying an electrical stimulation to a first area of a user's body to induce a second area of the user's body to experience a level of natural sensation in response to an action occurring in a simulated remote environment and an intensity of the action is described. The system includes a controller to set parameters for the electrical stimulation based on the action occurring in the simulated remote environment and an
(Continued)

10 intensity of the action. The system also includes a signal generator to generate the electrical stimulation comprising the parameters. The system also includes a skin surface electrode placed at a first location on a user's body remote from a second location on the user's body to deliver the electrical stimulation with the parameters to a nerve at or near the first area of the user's body.

18 Claims, 16 Drawing Sheets

(58) Field of Classification Search
  CPC ..... A61B 5/1124; A61B 5/4851; A61B 5/486; A61N 1/0456; A61N 1/0496; A61N 1/36034
  See application file for complete search history.

(56)                      References Cited

U.S. PATENT DOCUMENTS

2021/0286433 A1     9/2021  Nickerson
2023/0400923 A1*  12/2023  Segil ........................ G06F 3/016

* cited by examiner

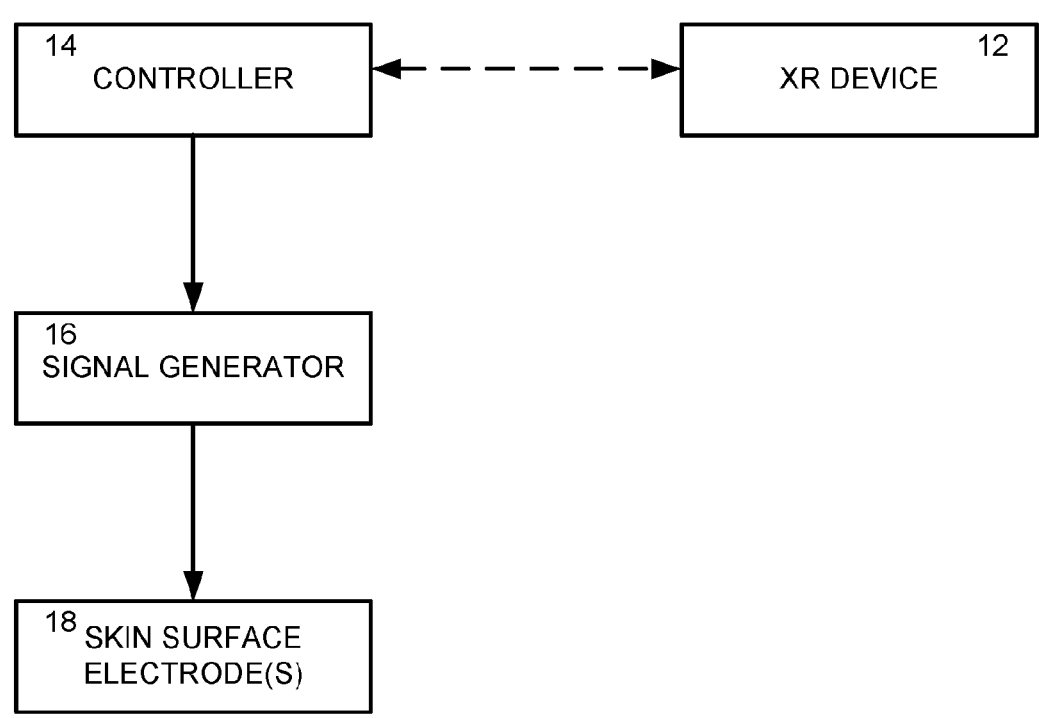
FIG. 1

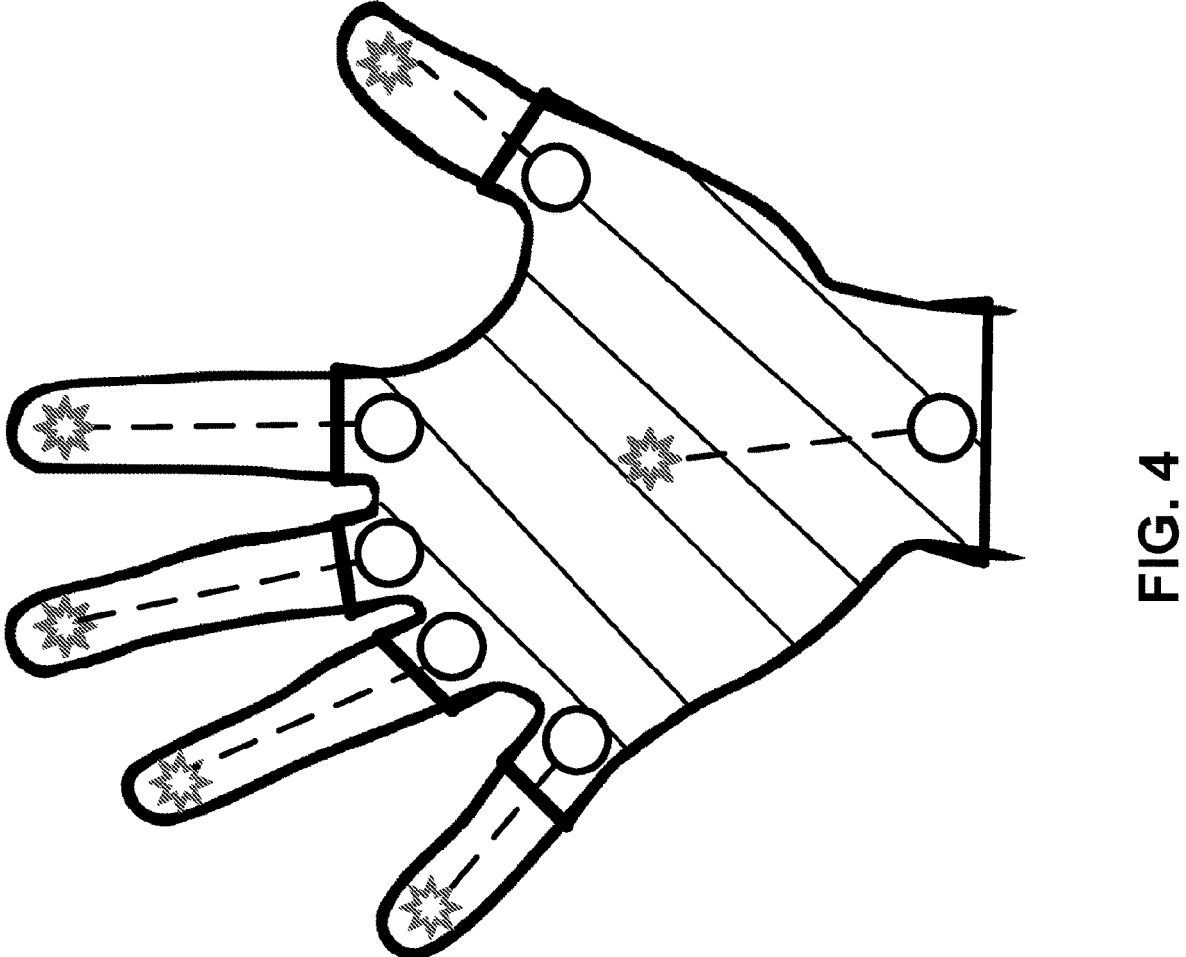
FIG. 4

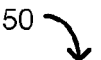
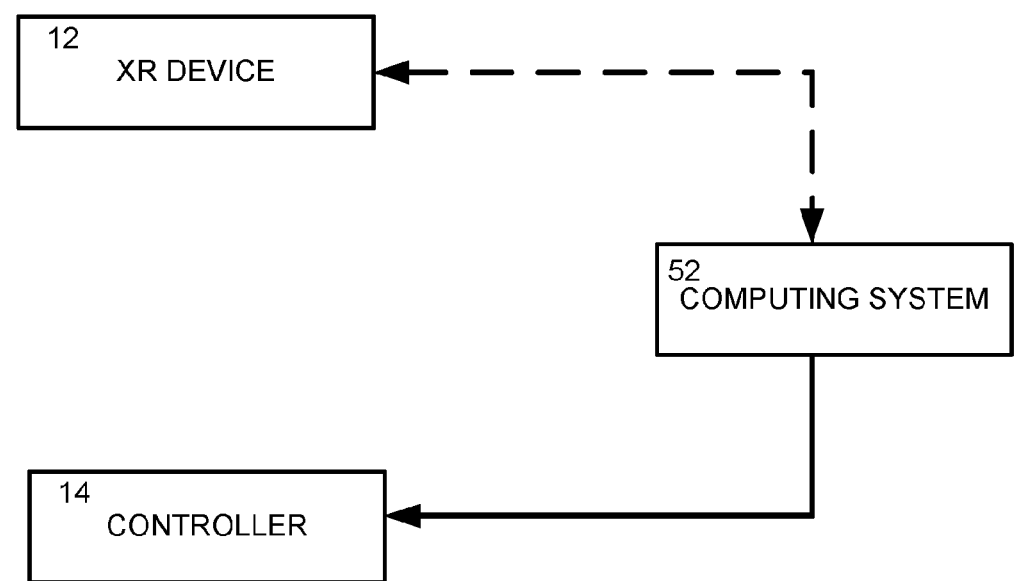
FIG. 5

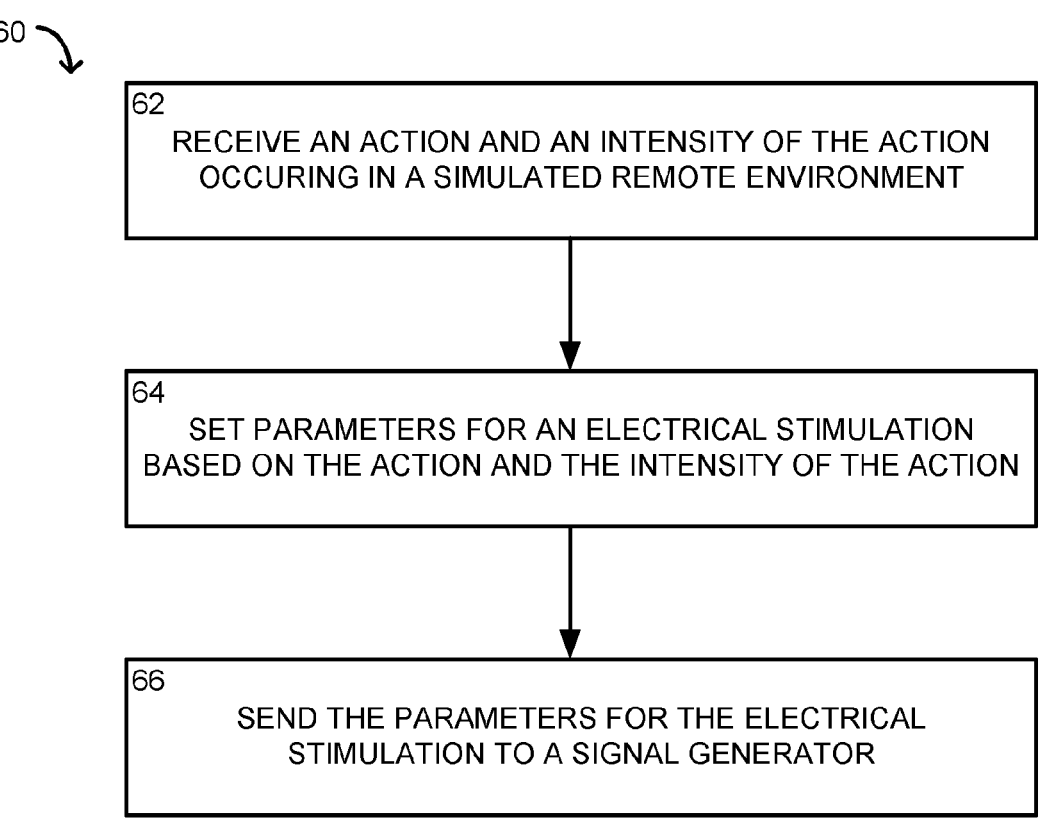

60

62
RECEIVE AN ACTION AND AN INTENSITY OF THE ACTION OCCURING IN A SIMULATED REMOTE ENVIRONMENT

64
SET PARAMETERS FOR AN ELECTRICAL STIMULATION BASED ON THE ACTION AND THE INTENSITY OF THE ACTION

66
SEND THE PARAMETERS FOR THE ELECTRICAL STIMULATION TO A SIGNAL GENERATOR

FIG. 6

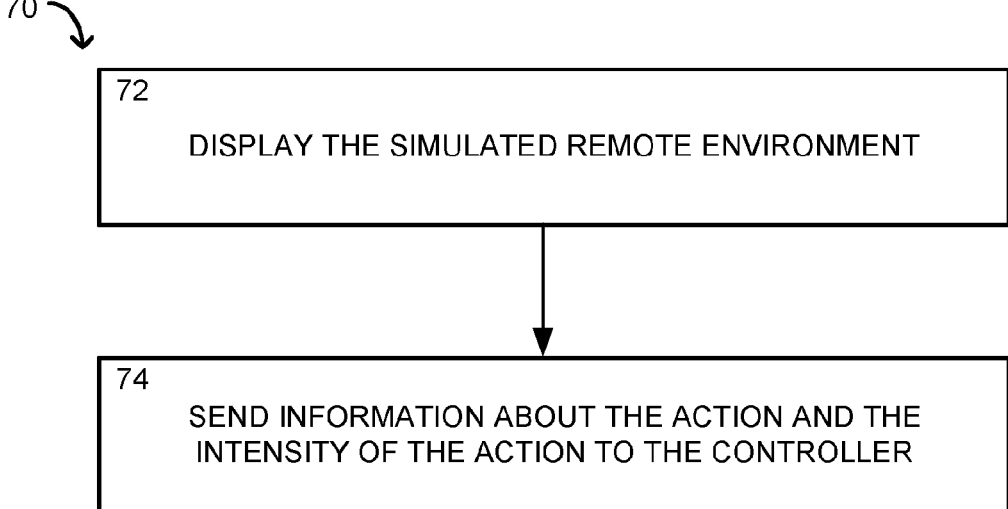

70

72
DISPLAY THE SIMULATED REMOTE ENVIRONMENT

74
SEND INFORMATION ABOUT THE ACTION AND THE INTENSITY OF THE ACTION TO THE CONTROLLER

FIG. 7

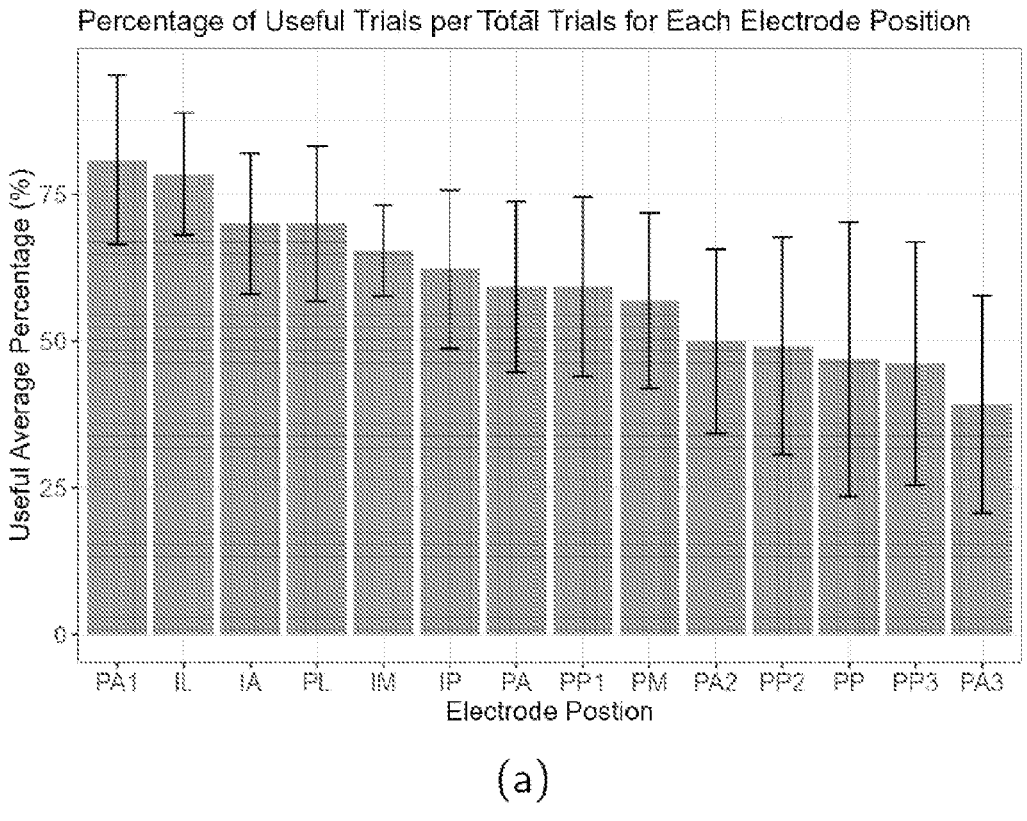
(a)
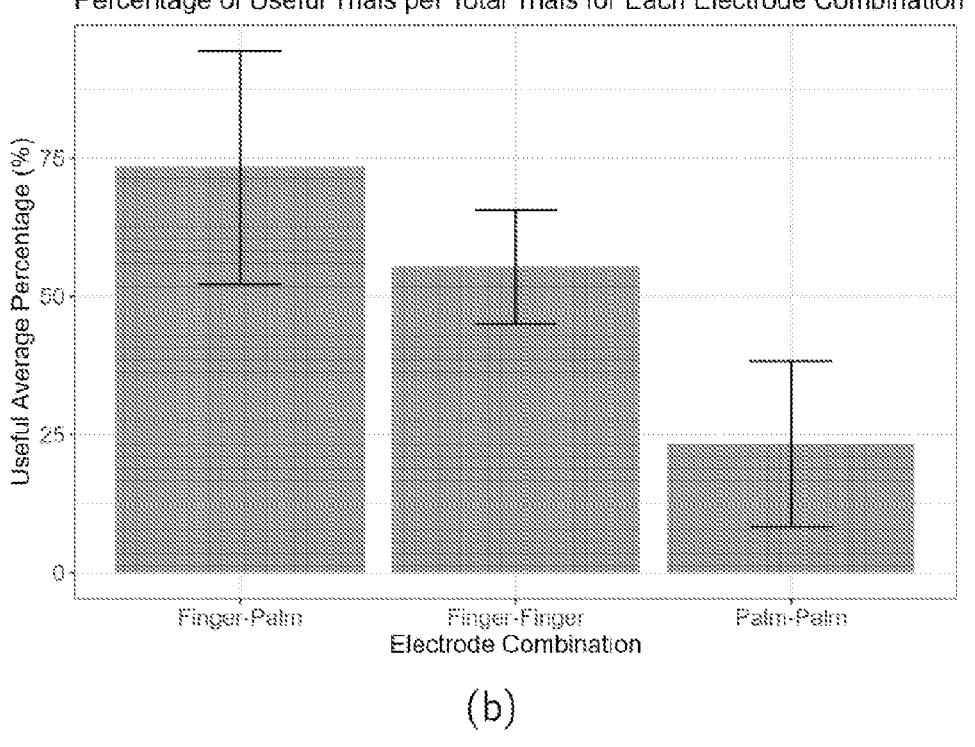
(b)
FIG. 11

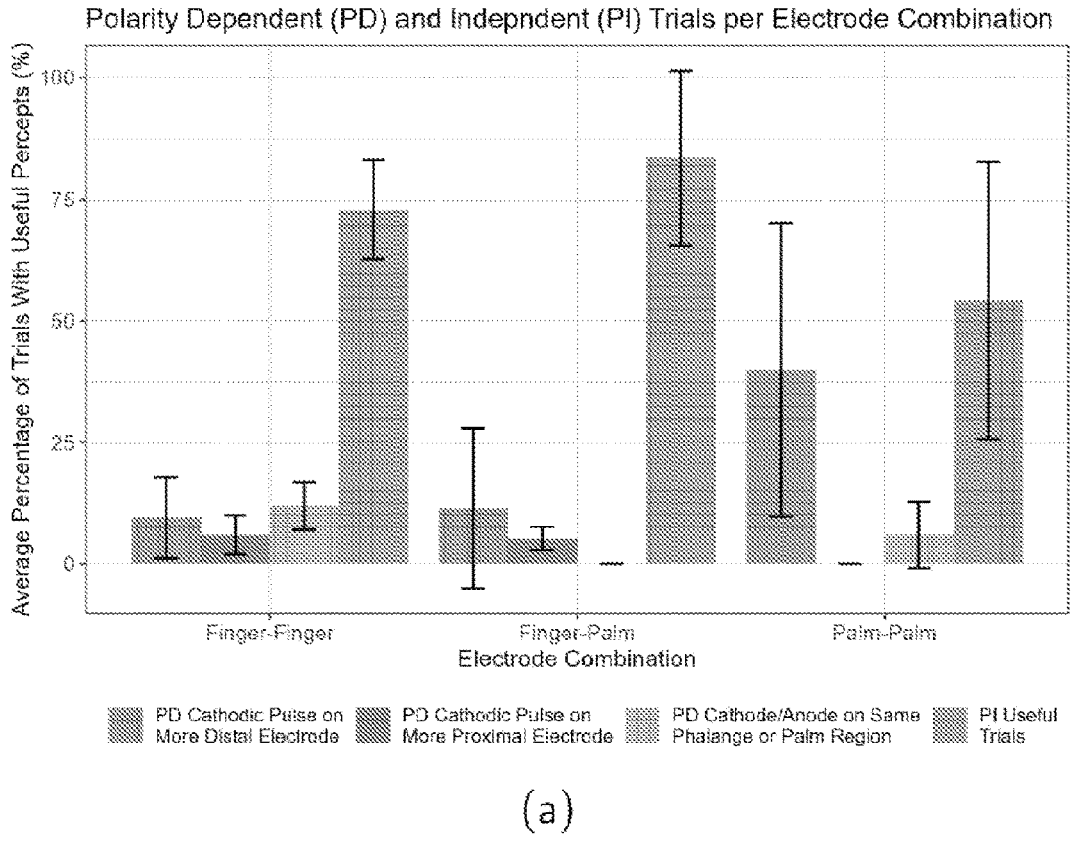
(a)
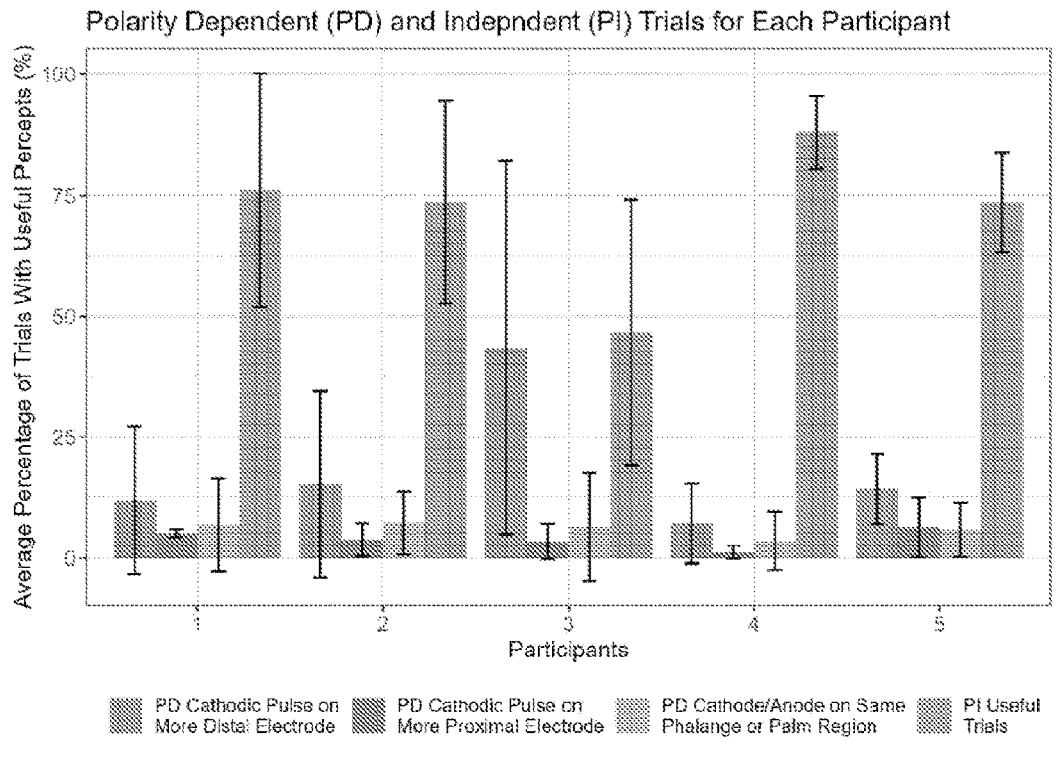
(b)
FIG. 12

(a)                                        (b)

SURFACE ELECTRICAL NERVE STIMULATION DELIVERED AS HAPTIC FEEDBACK TO CAUSE A USER TO EXPERIENCE NATURAL SENSATION

CROSS-REFERENCE TO RELATED APPLICATIONS

This application claims the benefit of U.S. Provisional Application Ser. No. 63/352,654, filed 16 Jun. 2022, entitled "SURFACE ELECTRICAL NERVE STIMULATION DELIVERED AS HAPTIC FEEDBACK TO CAUSE A USER TO EXPERIENCE NATURAL SENSATION", and also claims the benefit of U.S. Provisional Application Ser. No. 63/394,319, filed 2 Aug. 2022, entitled "SURFACE ELECTRICAL NERVE STIMULATION DELIVERED AS HAPTIC FEEDBACK TO CAUSE A USER TO EXPERI-ENCE NATURAL SENSATION". The entirety of these provisional applications is incorporated by reference for all purposes.

TECHNICAL FIELD

This disclosure relates generally to haptic feedback delivered by electrical nerve stimulation and more specifically to systems and methods that deliver surface electrical nerve stimulation to a nerve at or near a first area of a user's body to induce a second area of the user's body to experience a natural sensation as haptic feedback.

BACKGROUND

As the gaming industry evolves to include different and more advanced technologies, users become able to experience extended reality (XR) situations. XR (or even a veridical environment located remote from a user) can become more realistic to a user when haptic feedback is delivered as actions occur in the simulated remote environment. Haptic feedback generally refers to the use of touch to communicate with one or more users. Current haptic feedback technologies, like vibrational motors, force feedback exoskeletons, and pneumatic bladder systems, do not provide a natural representation of touches related to actions occurring in the simulated remote environment, impede user movement, and are bulky, stationary, and/or have limited workspaces. Electrical nerve stimulation may be used to provide an alternative to traditional haptic feedback.

Currently, electrical nerve stimulation used to provide haptic feedback is often described as uncomfortable or is known to cause paresthesia/numbness. Additionally, such electrical nerve stimulation is delivered directly to the location meant to feel the sensation, which can get in the way of a user's movements and function. Recently, an electrical nerve stimulation approach that is much more realistic using a new type of waveform was developed for use with implanted electrodes in direct contact with the nerves of people with limb loss. However, implanting electrodes into a user's body is not practical in conventional XR applications for people without limb loss.

SUMMARY

Described herein is a non-invasive approach for haptic feedback using electrical nerve stimulation in which surface electrical stimulation to a nerve at or near a first area of a user's body using one or more surface electrodes induces a person to perceive natural sensations occurring at a second area of the user's body to use as haptic feedback related to a simulated remote environment, which may exist in extended reality (XR) or may be a veridical environment located remote from a user.

In an aspect, the present disclosure can include a system that can apply an electrical stimulation to a first area in a user's body to induce a second area in the user's body to experience a level of natural sensation in response to an action occurring in a simulated remote environment and an intensity of that action. The system includes a controller that can be configured to set parameters for electrical stimulation based on the action occurring in the simulated remote environment, the location of the action occurring in the simulated remote environment, and the intensity of the action occurring in the simulated remote environment. The system also includes a signal generator, coupled to the controller, that can be configured to generate the electrical stimulation comprising the parameters. The system also includes at least one skin surface electrode, coupled to the signal generator, that can be configured to be placed at the first location on the user's body remote from the second location on the user's body. Application of the electrical stimulation with the parameters to a nerve at the first location on the user's body induces the second location on the user's body to experience a level of natural sensation in response to the action occurring in the simulated remote environment and the intensity of the action occurring in the simulated remote environment.

In another aspect, the present disclosure can include a device configured to at least a portion of a user's wrist, palm, elbow, forearm, and/or hand to apply an electrical stimula-tion to a first area of a user's body to induce a second area of the user's body to experience a level of natural sensation in response to an action occurring in a simulated remote environment and an intensity of the action. The device includes at least one skin surface electrode that can be configured to apply an electrical stimulation having param-eters to a nerve at a first location on the user's wrist, palm, elbow, forearm, and/or hand to induce a second location on the user's fingertip, finger, or hand to experience feedback in response to an occurrence of an action and an intensity of the action in a simulated remote environment, wherein the skin surface electrode is coupled to a signal generator that defines the electrical stimulation with the parameters, which is coupled to a controller that defines the parameters. The device also includes a securing means to secure the surface electrode to the user's wrist, palm, elbow, forearm, and/or hand. It should be noted that the device (e.g., glove) itself can be the securing means.

In a further aspect, the present disclosure can include a method for applying an electrical stimulation to a first area of a user's body to induce a second area of the user's body to experience a level of natural sensation in response to an action occurring in a simulated remote environment and an intensity of the action. The method includes receiving, by a controller, an action and an intensity of the action occurring in a simulated remote environment; setting, by the control-ler, parameters for electrical stimulation based on the action and the intensity of the action; and sending, by the control-ler, the parameters for the electrical stimulation to a signal generator. The signal generator generates the electrical stimulation signal comprising the parameters and sends the electrical stimulation signal to a skin surface electrode to deliver the electrical stimulation signal to a nerve at a first location on a user's body to induce a second location on the user's body to experience a level of sensation in response to the action and the intensity of the action occurring in the simulated remote environment.

In another aspect, described is a method executable by a controller and/or signal generator to assign stimulation parameters to different surface electrodes related to an action occurring in the stimulated remote environment. The surface electrodes can deliver the stimulation to a nerve at a first location of one or more of the surface electrodes to cause a second location to experience a sensation related to the action. The second location can be different from the first location such that the stimulation of a nerve at or near the first location can cause a distally referred sensation at the second location. For example, the location receiving the stimulation can be on the hand and the second location can be on a fingertip.

BRIEF DESCRIPTION OF THE DRAWINGS

The foregoing and other features of the present disclosure will become apparent to those skilled in the art to which the present disclosure relates upon reading the following description with reference to the accompanying drawings, in which:

FIG. 1 is a diagram showing an example system that can be used to deliver surface electrical nerve stimulation at a nerve at or near a first area of a user's body to induce a second area of the user's body to experience a natural sensation as haptic feedback in accordance with an aspect of the present disclosure;

FIG. 4 is a diagram showing an example of the sensory device of FIG. 3;

FIG. 5 is a diagram showing communication between components of the system of FIG. 1 with a computing system;

FIGS. 6 and 7 are process flow diagrams illustrating methods for delivering surface electrical nerve stimulation to a nerve at or near a first area of a user's body to induce a second area of the user's body to experience a natural sensation as haptic feedback in accordance with another aspect of the present disclosure;

FIGS. 11 and 12 show graphical representations of experimental results;

DETAILED DESCRIPTION

I. Definitions

Figure 2:
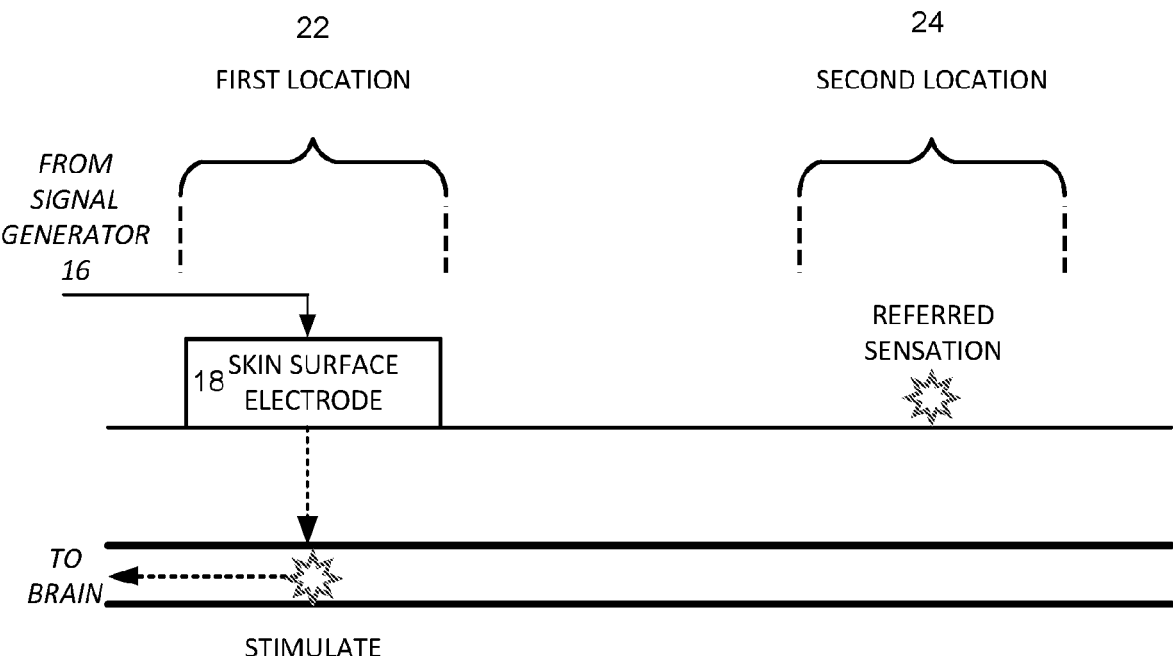
FIG. 2 is a diagram showing an example electrical nerve stimulation by the system of FIG. 1 of the nerve at or near a first location to cause referred sensation at a second location.

Unless otherwise defined, all technical terms used herein have the same meaning as commonly understood by one of ordinary skill in the art to which the present disclosure pertains.

As used herein, the singular forms "a," "an," and "the" can also include the plural forms, unless the context clearly indicates otherwise.

As used herein, the terms "comprises" and/or "comprising," can specify the presence of stated features, steps, operations, elements, and/or components, but do not preclude the presence or addition of one or more other features, steps, operations, elements, components, and/or groups.

As used herein, the term "and/or" can include any and all combinations of one or more of the associated listed items.

As used herein, the terms "first," "second," etc. should not limit the elements being described by these terms. These terms are only used to distinguish one element from another. Thus, a "first" element discussed below could also be termed a "second" element without departing from the teachings of the present disclosure. The sequence of operations (or acts/ steps) is not limited to the order presented in the claims or figures unless specifically indicated otherwise.

As used herein, the term "haptic feedback" can refer to the use of touch to communicate with one or more users. When used in connection with alternate reality applications, the haptic feedback can be delivered in response to an action occurring in a simulated remote environment. As used herein, haptic feedback can be delivered by an electrical nerve stimulation. When delivered by an electrical nerve stimulation, the haptic feedback can provide a natural sensation to a user.

As used herein, the term "natural sensation" can refer to an elicited perception that mimics and/or replicates the physical feeling of an action occurring in a simulated and/or remote environment. Natural sensation may be different from a sensation due to a mechanical stimulus. In some instances, the perception can be elicited via an electrical nerve stimulation of one or more sensory nerves. The natural sensation can be felt as a referred sensation remote from the location where the electrical nerve stimulation is applied.

As used herein, the term "referred sensation" relates to a somatosensory feeling that is perceived to emanate from a body part other than, but in association with, the body part being stimulated. For example, a distally referred sensation can be caused by stimulating a nerve at or near a first location to introduce a somatosensory feeling at a second location (e.g., a fingertip) associated with the first location (e.g., connected on a same nerve, same nerve root, same vertebral level, or the like). The referred sensation can at least approximate a natural sensation.

As used herein, the term "electrical nerve stimulation" can refer to the delivery of one or more electrical pulses (current and/or voltage) to cause one or more nerves to conduct one or more action potentials. Electrical nerve stimulation and "electrical stimulation" may be used interchangeably herein. Examples of the electrical pulses can include square, rectangular, ramp, logarithmic, exponential, and the like. The electrical pulses can be a single pulse, but also may include patterns of two or more pulses.

As used herein, the term "simulated environment", also referred to as a "simulated remote environment", can refer to an at least partially computer-implemented environment that user can experience and/or interact with, including but not limited to locations, objects, simulated beings, and other users of the at least partially computer-generated environment. The term "remote" can refer to the environment being at least partially computer implemented. For example, actions can occur in the simulated remote environment that may be controlled by the user or can happen to the user. The simulated remote environment may exist in extended reality (XR) and/or may be a veridical (real world) environment located remote from a user.

As used herein, the term "extended reality" or "XR" is an umbrella term that can refer to any real-and/or-virtual combined environment and human-machine interactions (e.g., an action and visual/haptic feedback) generated by computer technology and/or wearables (e.g., a head-mounted display, smart glasses, and the like). XR can include virtual ranges from partial sensor inputs to immersive virtual reality. XR includes, but is not limited to, representative forms such as augmented reality (AR), mixed reality (MR), virtual reality (VR), and the areas therebetween. One example of an XR is a complete VR, where the simulated remote environment is fully computer implemented and does not include real environment constraints past setting boundary conditions. Another example of XR is AR, where the simulated remote environment is partially computer implemented and partially involves the real environment and is enhanced by the computer implemented portion.

As used herein, the term "intensity" of an action occurring in a simulated remote environment can refer to a measurable amount of a property related to the action. For example, a force associated with an action. The intensity of the action can be reflected in an electrical stimulation signal by varying one or more parameters related to strength and/or one or more parameters related to timing.

As used herein, the term "skin surface electrode" can refer to an electrode that can be placed on or near the surface of a user's skin to transmit an electrical signal through the user's skin. For example, one or more skin surface electrodes can be positioned at a first area of a user's body (e.g., in a predefined position within a glove or other device worn by a user) to deliver at least a part of an electrical stimulation to the first area of the user's body to induce a second area of the user's body to experience a level of natural sensation.

As used herein, the term "user" can refer to one or more humans that may be immersed in an XR environment and/or simulated remote environment.

II. Overview

A simulated remote environment (e.g., in extended reality (XR) and/or a veridical environment located remote from a user) can become more realistic to a user when haptic feedback is delivered as actions occur in the simulated remote environment. However, current haptic feedback technologies cannot provide a natural representation of touches related to actions occurring in the simulated environment and/or severely impede a user's real-life mobility when used. Electrical nerve stimulation may be used to provide an alternative to traditional haptic feedback. However, currently available electrical nerve stimulation used to provide haptic feedback is often described as uncomfortable or is known to cause paresthesia/numbness. Additionally, such electrical nerve stimulation is stimulating the location meant to feel the sensation (e.g., sensation on the fingertip comes from a stimulation by an electrode on the fingertip), which can get in the way of a user's movements and function. Recently, an electrical nerve stimulation that uses implanted electrodes and a new type of waveform to provide a significantly more realistic sensation was developed for use for people with limb loss. The implanted electrodes are in direct contact with the nerves of people with limb loss, but implanting electrodes into a user's body is not practical in conventional XR applications for people without limb loss.

The present disclosure describes a non-invasive approach for haptic feedback in the form of a referred sensation. The haptic feedback is delivered using electrical nerve stimulation to create a natural sensation that is more realistic based on the recently developed electrical nerve stimulation approach modified to be delivered by one or more surface electrodes. Notably, the surface electrodes are placed at locations that do not hamper the user's movements but can provide a referred sensation to different locations through an underlying nerve. The feelings of haptic feedback (e.g., the natural sensation of touch) are experienced at a location (e.g., one or more location) that would be touching whatever object the haptic feedback is being delivered for (e.g., an object within an application using XR) via referred sensation by stimulating a nerve at or near a first area neurologically associated with the location of the feeling but not at the location of the feeling (e.g., the fingertip). This approach targets the nerves connecting the brain to the region where sensory receptors exist (e.g., on the fingertip) and as the stimulation activates those nerves from location (e.g., along the finger), the brain associates the nerve activity with sensations that occur at the region(s) on the fingertip that those nerves are connected to even though the sensory receptors in those region(s) on the fingertip have not been activated by physical contact, force, or direct stimulation. Accordingly, systems and methods described herein can deliver surface electrical stimulation at a first area of a user's body to induce a second area of the user's body to experience a natural sensation as haptic feedback from a simulated remote environment, which may exist in XR or may be a veridical environment located remote from a user. It should be noted that this stimulation mechanism targets a nerve rather than a mechanoreceptor to provide sensation a location different from the stimulation location.

III. Systems

An aspect of the present disclosure relates to a non-invasive approach for delivering haptic feedback to a user of a simulated remote environment, where the simulated remote environment may be an extended reality (XR) or may be a veridical environment located remote from a user. As shown in FIG. 1, a system 10 can be used to deliver surface electrical nerve stimulation to a nerve at a first area of a user's body to induce a second area of the user's body to experience a referred natural sensation as haptic feedback. The referred sensation is due to an afferent action potential transmission from a peripheral sensory nerve to the spinal cord and up to the brain, which perceives the action potentials as sensory information from the second area. Although the drawings illustrate tools from an XR environment (e.g., at least partly virtual environment), it will be understood that the system 10 can be operational in any simulated remote environment (e.g., in an environment that is veridical, but remote from the user).

The system includes an XR device 12 that can be configured to display visual (and optionally audio) information related to a simulated remote environment to a user (e.g., by a display of the XR device 12) and/or control at least a part of the simulated remote environment (e.g., through a physical computer system acting as a controller and/or motion sensing capabilities (e.g., provided by sensors and/or tracking devices) of the XR device 12). Accordingly, the XR device 12 can include processing and control components and a visualization component that can allow a user to see at least some elements of the simulated environment. Optionally, the XR device can also include an audio component (e.g., speaker(s)) to allow the user to hear at least some elements of the simulated environment. As an action occurs in the simulated environment (or after the action occurs in the simulated environment), the XR device 12 can facilitate haptic feedback to the user, where the haptic feedback is related to the action in the simulated environment. The action can be at least one of an action by the user, an action happening to the user, an interaction between the user and an object, surface, or other aspect of the simulated remote environment, or the like (it should be understood that the XR device can also communicate a signal to a controller 14, a game engine, or the like). For example, the XR device 12 can facilitate haptic feedback to the user by communicating a signal that indicates a type of action, a location of the action with respect to the user, and/or an intensity of the action in the simulated remote environment wirelessly. In such situations, the XR device can also include at least a wireless transmitter and in some instances can include a wireless receiver and/or wireless transceiver. The XR device 12 can also include a non-transitory memory storing instructions and a processor (which may include the non-transitory memory) to access the stored instructions and execute the stored instructions to perform tasks required for operation. At least some of the tasks required for operation can include running a game or simulation of a remote environment, visualizing the game or simulation, receiving a motion by the user and inputting the motion into the game or simulation, or the like. Although labeled as an "XR" device, it should be understood that the XR device 12 can be any device that facilitates visualization and haptic feedback related to any at least partially simulated environment.

The system 10 can include a controller 14 (e.g., a micro-controller) that can include a non-transitory memory storing instructions and a processor (which may include the non-transitory memory) to access the stored instructions and execute the stored instructions to perform tasks required for operation. The controller 14 can at least partially wirelessly communicate with the XR device 12 at least by receiving the signal that indicates an intensity of the action, a location of the action, and/or a nature of the action in the simulated remote environment. The controller 14 can include at least one of a wireless transmitter, receiver, or transceiver (not shown) for wirelessly receiving and/or transmitting signals, data, and/or information directly from the XR device 12. As another example, the controller 14 can communicate with the XR device 12 through a device like a game engine (e.g., of the computing system 52 shown in FIG. 5), where the XR device 12 can communicate wirelessly to the computing system (including at least one wireless communication device not shown) and the computing system can communicate with the controller 14 via a wired connection. The controller 14 can determine the nature of the action, the intensity of the action, the location of the action, and the duration of the action, and determine one or more parameters required for an electrical stimulation (to reflect the intensity, the strength, the location, and/or the timing of the referred sensation for the action).

The controller 14 can be coupled to a signal generator 16 over a wired and/or wireless connection. While not shown, in some instances, the signal generator 16 and the controller 14 can be embodied as a single device. The controller 14 can send the signal generator 16 a signal indicating the one or more parameters required for the electrical stimulation (e.g., a pulse or a pattern of pulses) to be applied to the user to generate the referred sensation for the action in the simulated remote environment. Upon receiving the signal from the controller 14, the signal generator 16 can generate the electrical signal with the one or more parameters and send the electrical signal to at least one of the one or more skin surface electrode(s) 18, which can be positioned on the user's skin. As an example, the one or more parameters can include (but are not limited to) pulse width, frequency, amplitude, pulse shape, interpulse interval, recharge phase amplitude, recharge delay, etc. The type of stimulation referenced herein can include patterned stimulation intensity (or $\psi$ stim), which can refer to a variation of one or more stimulation parameters so that a pulse or pattern of pulses in a stimulation signal can provide and/or reflect a certain intensity of the action. For example, the patterned stimulation intensity can include a stimulation waveform (also referred to as the electrical stimulation) having a pulse amplitude (PA) that is first adjusted (e.g., during a calibration phase before using the system 10 via the controller 14) to achieve a maximum pulse width (PW) range inside the capabilities of the simulators (e.g., skin surface electrode(s) 18). During use of the system 10 the pulse width (PW) of the stimulation waveform can be adjusted (by the controller 14) to modulate the intensity of the referred sensations based on the action at the time (e.g., the user's hand's interactions with virtual and/or remote objects), the frequency of the stimulation waveform can be adjusted (by the controller 14) to modulate the frequency of the referred sensation (e.g., continuous or tapping sensation and speed of taps), and the symmetry and shape of the stimulation waveform can be changed (by the controller 14) to modulate the quality of the referred sensation being felt based on the action.

The controller 14 can change at least one of the one or more parameters in response to the action or the intensity of the action in the simulated remote environment changing over time. Making the experience of using the system 10 more lifelike and/or nuanced than current XR or remote control systems. The action can be at least one of an action by the user, an action happening to the user, an interaction between the user and an object, surface, or other aspect of the simulated remote environment, or the like. Thus, depending on the specific action itself one or more referred sensations can be sent to the user for each time point of the action via one or more changes to the one or more parameters of the electrical signal.

The controller 14 can determine the area of the user's body where the haptic feedback should be felt via the referred sensation based on the signal received from the XR device related to the action in the simulated remote environment. The controller 14 can choose which of the one or more skin surface electrodes 18 should deliver the electrical stimulation so that the proper area of the body receives the haptic feedback as a referred sensation. For example, each of the one or more skin surface electrodes 18 can be positioned at different locations on the user's body. The locations of each of the one or more skin surface electrodes 18 can be predetermined to cause (when stimulated) a referred sensation in a specific second location (the second location can be distal to and different from the location of the given electrode). In such instances, the controller 14 can direct the signal generator 16 to send the electrical signal with the one or more parameters to the chosen at least one of the one or more skin surface electrodes 18 to create referred sensation(s) at and/or near the location(s) of the user's body that is affected by the action in the simulated remote environment. In some instances, the controller 14 can determine an electrical signal should be sent to more than one of the skin surface electrodes 18, and the electrical signal sent to each of the more than one skin surface electrodes can be the same or different, depending on the action and/or the action's intensity.

As noted, the system 10 can include the one or more skin surface electrodes 18 that can deliver the electrical signal with the one or more parameters from the signal generator 16 through a user's skin and to at least one nerve (e.g., at least one nerve near and/or under a location of each of the one or more skin surface electrodes delivering the electrical signal). The one or more skin surface electrodes 18 can be coupled to the signal generator 16. The coupling can be over a wired connection, a wireless connection, or a combination of a wired and wireless connection. In some instances, the system 10 can include a single skin surface electrode located at a first location on a user's skin to provide a sensation at a known second location on the user's body (distal to the first location). However, in other instances, the system 10 can include a plurality of skin surface electrodes, located at a plurality of locations on the user's skin (e.g., each electrode at a different location), and each of the plurality of skin surface electrodes delivering an electrical signal can provide a referred sensation at a different second location on the user's body (distal to the stimulation locations). The referred sensation at each of the different second location(s) can each have an intensity level (referred to as the level of sensation), a nature (continuous or tapping), and/or a duration that can be based on the one or more parameters of the electrical stimulation. The referred sensation may be tactile feedback, sensory feedback, and/or kinetics-based force feedback (providing neuromuscular stimulation as well as sensory stimulation) from the simulated remote environment, for example.

Each of the one or more skin surface electrodes 18 can be placed at locations (first locations) on a user's body remote from second locations of the user's body that will receive the referred sensation(s). FIG. 2 shows an example system 20 that includes only one skin surface electrode 18, but it should be understood that the below discussion can apply to each of the one or more skin surface electrodes 18 discussed above with respect to FIG. 1. As shown in FIG. 2, the example system 20 can include a skin surface electrode 18 that can be positioned at a first location 22 on the user's skin and can receive an electrical signal from a signal generator 16. The electrical signal from the signal generator 16 can be delivered by the skin surface electrode 18 through the skin of the user to the nerve at or near the first location 22 on the user's skin. The electrical signal can stimulate the nerve at (or near) the first location 22. The nerve can be a sensory nerve that can transmit a neural signal to the brain. The nerve can be, in some instances, one or more sensory nerves and/or sensory fibers within a nerve. The stimulated sensory nerve can transmit a signal to the brain based on the electrical signal delivered by the skin surface electrode 18. (e.g., based on one or more parameters of the electrical signal determined by the controller 14 in FIG. 1 and the position of the first location on the user's body). The brain associates the nerve activity from the stimulation with sensations that occur at at least one second location 24 (e.g., may be a region such as the fingertip region) that the stimulated nerve (or those nerves, if more than one stimulated) is connected to even though the sensory receptors in the second location have not been activated by direct stimulation, physical contact, or force.

Accordingly, the brain experiences a referred sensation at the second location 24. The referred sensation can be felt at the second location 24 after sensory neurons in the nerve at (or near) the first location 22 are sufficiently stimulated (e.g., stimulated greater than a threshold to conduct the action potential, which can be predefined or defined upon a first use or calibration by the user). One important condition for the nerve to be stimulated by the electrical signal is that the nerve must innervate both the first location 22 and the second location 24. For example, the second location 24 can be located along the same nerve as the first location 22 and further from the spinal cord than the first location (e.g., the second location is distal from the first location). For example, the first location 22 can be a location on a wrist, a palm, an elbow, a forearm, and/or a hand, while the second location 24 can be a portion of a finger and/or a portion of the hand distal from the first location. In some instances, the first location 22 and/or the second location 24 can be located near a muscle. However, the first location 22 and/or the second location 24 need not be located near a muscle. It is important to note that the approach described herein is not targeting mechanoreceptors for traditional touch, pressure, vibration, and/or sound haptic feedback, but is electrically stimulating nerve(s) at first locations to cause referred sensations at second locations, different from the first locations, which are used for haptic feedback purposes.

Application of the electrical signal(s) with the one or more parameters to the first location 22 by the one or more skin surface electrodes 18 to stimulate the nerves at or near the first location induces the second location(s) 24 (e.g., distal to the first location) to experience a level of natural sensation (e.g., the referred sensation) in response to the action and the intensity of the action occurring in the simulated remote environment. For example, if the simulated remote environment has the user catching a ball (e.g., shown in FIG. 3), then the electrical signal(s) applied through the one or more skin surface electrodes at the first locations 22 can make the user feel like they are actually catching a ball at the second locations 24. Electrical signals having one or more different parameters can be applied to each the one or more skin surface electrodes 18 so that the natural sensations at the different second locations can mimic the feelings on the parts of the hand when the user catches the ball.

Stimulating the first location 22 with the electrical signal having the one or more parameters (as described above) provides a referred sensation at the second location 24, which is a more natural sensation compared to the sensation caused by direct stimulation at the second location. For example, a user feels less paresthesia from the referred sensation than from a direct electrical stimulation of a mechanoreceptor at that second location. Additionally, the second location 24 experiences a greater accuracy of sensation positioning when the nerve is stimulated by delivering the electrical signal from the skin surface electrode 18 (one of the one or more skin electrodes) located at the first location 22 compared to direct stimulation at the second location 24. It should be noted that distance between the first location 22 and the second location 24 does not degrade the accuracy of the sensation (e.g., an accurate strength of the sensation). Sensation accuracy (e.g., accuracy of sensation) means that when the second location 24 that receives the sensation is an area (e.g., of the hand) that should be receiving sensation based on the action of the simulated remote environment, and that the system 20 delivers the referred sensation to the correct second location 24. For example, when grabbing with the index finger in the simulated remote environment, the sensation delivered by system 20 is felt in the index finger, not the pinky. In other words, the second location 24 is the area affected by the action in the simulated remote environment.

Figure 3:
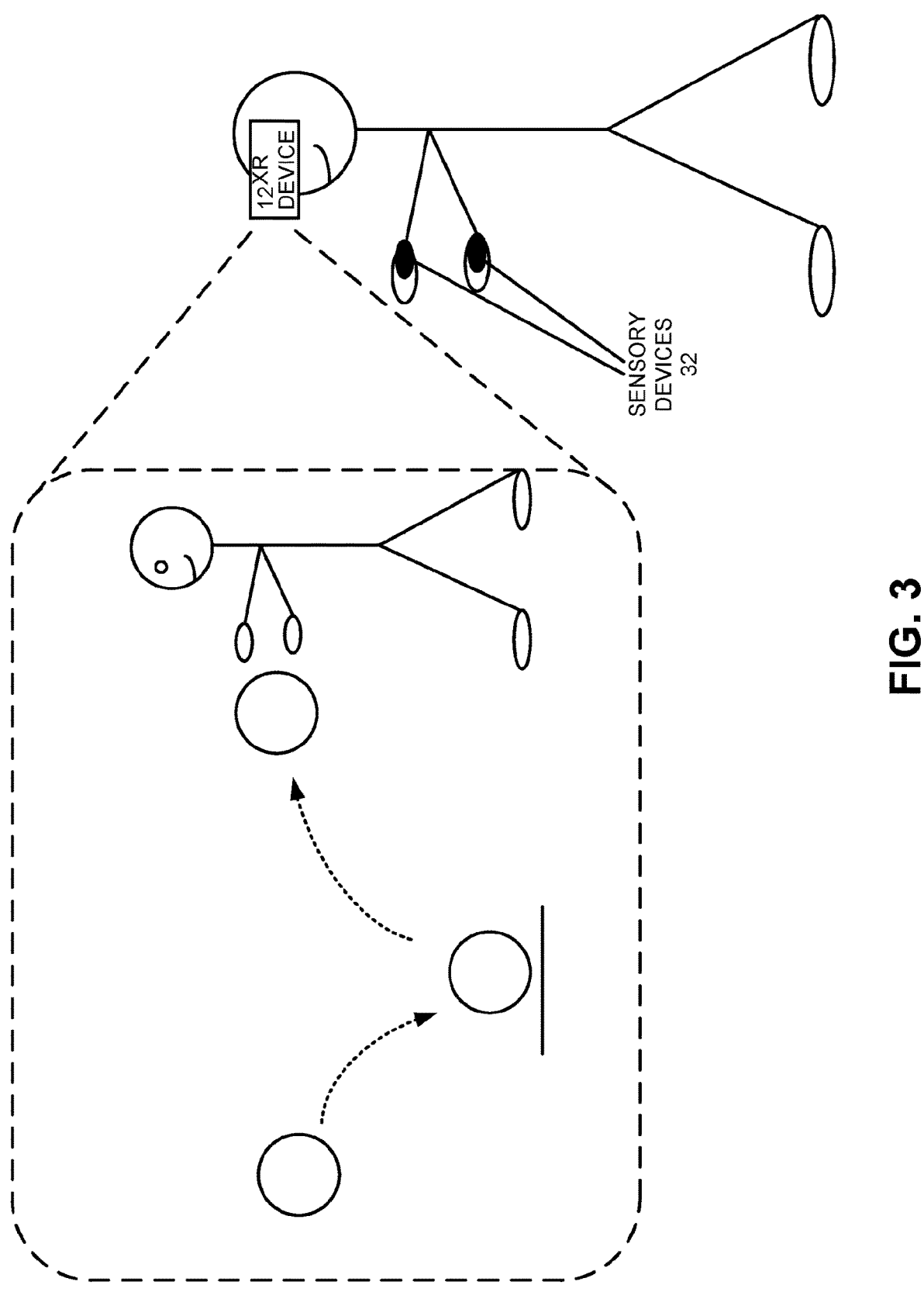
FIG. 3 is a diagram showing an example use of the system of FIG. 1 in an extended reality (XR) application.

In some instances, as shown in FIG. 3, the XR device 12 can be at least an XR head-mounted display device (or headset) worn by the user and the controller 14 and/or the signal generator 16 and the one or more electrodes 18 (of FIG. 1) can be embodied in one or more sensory devices 32 that can be worn by the user (e.g., on a hand, wrist, forearm, and/or elbow of the user). A sensory device 32 is shown worn on each of the user's hands in FIG. 3. The XR device 12 can provide at least a visualization of a simulated remote environment to the user. For example, FIG. 3 shows a visualization of a simulated remote environment that relates to a game in alternate reality (AR) and/or virtual reality (VR) with a bouncing ball that can be caught by the user. The XR device 12 can be connected to and/or include a device (e.g., at least a portion of computing system 52 shown in FIG. 5, or a separate controller and/or wireless communication device) that facilitates communication with the one or more sensory devices 32.

The one or more sensory devices 32 can be worn by the user and can generate a stimulation signal(s) (e.g., the electrical signal having the one or more parameters) (via signal generator 16 of FIG. 1) and can deliver the stimulation signal(s) to first location(s) on the user via one or more skin surface electrodes (e.g., the one or more skin surface electrodes 18 of FIG. 1 or FIG. 2) included in the sensory devices 32. For example, a sensory device 32 can be a glove, a fingerless glove, a wrist band, an arm band, a sleeve, or the like that obstructs the first location(s) 22 (where the stimulation is applied) but does not obstruct the second location(s) 24 (locations distal and remote from at least one of the first locations where the referred sensation is felt). For example, when the second location 24 is a portion of a fingertip, a sensory device 32 can cover a lower portion of the fingers, hand, and/or wrist and does not cover at least the respective fingertip. Keeping the fingertips uncovered, for example, allows the user to interact with real objects in AR with the fingertips normally and unimpeded. The fingertips are only one example, a sensory device 32 can be configured so that other portions of the fingers, hands, palms, wrists, etc. can also be left unobstructed.

In the example of FIG. 3 the action of the virtual ball being caught, as visualized by the XR device 12 in the pop out, can be accompanied by one or more feelings of catching the ball. The XR device 12 (and/or an attached computing device) can run, for example, a game where a user catches a ball (e.g., basketball, baseball, football, four square, dodgeball, or the like) and the XR device can visualize the simulated remote environment for the game. The XR device 12 can detect that the user is catching (or about to catch the ball) (e.g., by motion capture of the hands, motion sensors, position sensors and external cameras, or the like) for all the time points during the action of catching that should cause feeling if the ball was being caught in real life and can send a signal to the sensory devices 32 for each of the time points. The sensory devices 32 can receive the signal from the XR device 12 indicating the virtual user is catching (or about to be catching) the ball for each of the time points. The sensory devices 32 (including the controller 14 and signal generator 16 in addition to the one or more skin surface electrodes 18) can determine which of the one or more skin surface electrodes to stimulate and the one or more parameters for the electrical signal to be delivered through each determined skin surface electrodes, and then apply the electrical signals through the one or more skin surface electrodes to mimic the feeling of the catch through referred sensations throughout the hands. The referred sensations can be, for example, as simple as a tingle increasing in intensity over the time of the catch to show the force of the ball's impact with the hands to as detailed as the natural sensations including the spot feelings of catching a ball with bare hands in real life. It should be understood that the example of FIG. 3 is only one simple example and the system 10 can be used for any other virtual reality, augmented reality, and/or remote system control uses that an XR device and traditional haptic or computer control are currently used for.

As shown in FIG. 4, one example of a sensory device 32 can be a reusable fingerless glove that can be configured to cover at least a portion of the user's hand (e.g., a portion of the palm and/or back of hand and one or more fingers and/or thumb) and to leave at least a portion of one or more of the user's fingers uncovered. However, other wearable sensory devices 23 can be used. For example, a glove may not be necessary and skin surface electrodes may be included in one or more straps or other devices designed to hold the skin surface electrodes. In other examples, not shown, the sensor device 32 can be configured to be worn on lower limbs (e.g., a sock like device, a shoe like device, a leg band or wrap, etc.) or the trunk of the user (e.g., stick on patches, body wraps, etc.) additionally, or alternatively.

As shown in FIG. 4, most, or all, of the user's fingers can be left uncovered by the glove. The glove can include one or more skin surface electrodes (shown as circles at the base of each of the fingers and thumb and at the wrist in this example) at different first locations within the glove that touch the skin. FIG. 4 shows six skin surface electrodes (but any number and any locations on the inside of the glove are contemplated) each designed to excite a different second location (shown as six different stars, with dashed lines connecting each electrode to the respective excitation location) to feel a given referred sensation at another location (e.g., one or more second location). The second locations are only shown for example and depend on the first locations of each of the skin surface electrodes (e.g., each have the same nerve running through). The glove can include at least one securing means to secure the skin surface electrodes to the user's hand (e.g., a Velcro, a button, elastic, etc.). Alternatively, the glove itself may provide the securing means (e.g., elastic material that stretches when putting on and then fits to the hand/wrist of the user). The skin surface electrodes, in some instances, can be in predefined places within the glove (e.g., to create a predefined electrode configuration where the locations of each skin surface electrode correspond to desired locations of experiencing sensation via feedback). The glove can come in different sizes (e.g., small, medium, and large) for different users with differently shaped and/or sized hands. The skin surface electrodes can activate digital nerves and/or nerves in the palm to evoke referred sensations in the respective second locations. The referred sensation can be tactile sensations, such as a touch force, pain, heat, or the like.

Each skin surface electrode of the sensory device 32 can be configured to apply an electrical signal (also refers to as a stimulation, electrical stimulation, or stimulation signal) having one or more parameters configured by a controller and signal generator (not shown in FIG. 4 but shown in FIG. 1 as controller 14 and signal generator 16) to a nerve at or near the location of the skin surface electrode. As shown, the respective first locations can be on the hand, palm, or the wrist, but it should be understood that the first locations may also be on the elbow or forearm. As illustrated, the second locations are on the fingertip or the hand or palm. As noted, the second location can experience feedback (in the form of a referred sensation) in response to stimulation at the first location due to an occurrence of an action and an intensity of the occurrence of the action in a simulated remote environment.

FIG. 5 shows an example connection 50 between the XR device 12 and the controller 14. The XR device 12 may be connected to a computing system 52 in a bidirectional manner. The computing system 52 may be at least partially embodied as a portion of the XR device 12, such as a non-transitory memory and/or processor or may be a separate controller comprising at least a non-transitory memory and/or processor of its own. As shown in FIG. 5, the connection between the XR device 12 and the computing system 52 can be wireless. However, the connection between the XR device 12 and the computing system 52 may be wired or a combination of wired and wireless. The connection between the computing system 52 and the controller 14 is at least unidirectional (but may be bidirectional) and can be at wired and/or wireless. The computing system 52 can engage in communications with additional components to provide haptic feedback in a networked teleoperation system. It should be noted that the computing system 52 can include one or more devices that can connect to the XR device 12, the controller 14, and any necessary additional devices. The computing system 52 can be, for example, a smart phone, a laptop computer, a desktop computer, a gaming system, a dedicated AR/VR device (when implemented as part of the XR device 12), or the like.

The computing system 52 can facilitate creation of a simulated remote environment for XR (e.g., AR or VR or the like) and/or in a veridical environment located remote from a user (e.g., controlling a machine at a remote location and viewing and receiving feedback therefrom). As an example, in a veridical environment located remote from a user, visual, audio, and haptic information from a remote environment can be transceived through the computing system 52, which can render visuals (and optionally audio) to the XR device 12 and haptic information to the user through the controller 14. As another example, in a simulated remote environment, visual, audio, and haptic information stored in a memory (e.g., saved or transmitted game information) can be transceived through the computing system 52, which can render visuals (and optionally audio) to the XR device 12 and haptic information to the user through the controller 14.

Examples of haptic information (e.g., haptic feedback) possibilities are Innumerable. For example, for immersive head-mounted VR, typical interactions between the hand and simulated objects in a virtual environment can be displayed on the XR device 12 and haptic sensations resulting from the interactions can be felt by the user of system 10 as referred sensations. Typical interactions can include, but are in no way limited to, grasping objects, feeling sound waves emitted by a subwoofer, squeezing a bag of pastry icing, crumbling a block of powder, feeling the texture of a washboard, feeling what a robot's force sensors detect, searching for an object buried in sand, etc. For non-immersive VR, haptic sensations can be from mobile devices (phones, tablets, smartwatches) that have hand tracking capabilities using their onboard sensors (cameras, laser, radar, time-of-flight, or other range or 3D sensors). Haptic feedback can also represent a simulated or sensor-acquired information stream, such as magnetic or chemical signals detected by sensors.

As an example for a veridical environment use of the system 10 (and connections 50), the computing system 52 can be used to facilitate display of visual feedback and haptic feedback (in the form of referred sensations) from a real world remote environment where a user is remotely controlling a robotic avatar. The visual feedback can be displayed on the XR device 12 worn by the user and the user's head or hand motions, for example, can be captured by the XR device 12 (e.g., by one or more sensors (accelerometer, IMU, gyroscope, etc.) and/or a camera) and/or captured from one or more sensors (accelerometer, IMU, gyroscope, etc.) in the one or more sensory device (not shown in FIG. 5, in communication with the controller 14) and transmitted to a robotic avatar at the remote environment by software through the internet or other public or private network to produce interactions between the robotic avatar and the remote environment. The tactile and force interactions produced between the robotic avatar and the remote environment can be sensed by one or more sensors (e.g., force, accelerometers, IMUs, gyroscopes, joint torque sensors, temperature sensors, pressure sensors, or the like) on the robotic avatar and can be received by software in the computing system 52 through the internet or other public or private network and can be provided to the user as haptic feedback through the controller 14 to the user using the stimulation technique described above for referred sensation. In short, the controller 14 can send electrical signals to a signal generator and the signal generator can send the electrical signals to one or more skin surface electrodes (not shown in FIG. 5) that can deliver the electrical signal to a nerve at or near the location of the one or more skin surface electrodes so that the user can feel the tactile and force interactions (or safe facsimiles/approximations thereof) produced at the remote environment at locations remote from the one or more skin surface electrodes. An example of a feedback loop for a robotic hand is the "display" (e.g., feel) of tactile information from tactile sensors mounted to the finger of a robotic hand at the second locations on the fingers of the user, as well as simultaneously stimulating (via neuromuscular electrical stimulation (NMES)) the wrist extensor and flexor muscles to "display" (e.g., feel) force information from a joint torque sensors embedded in the actuators of the robotic hand's wrist. The robotic hand's movement can be controlled via mirroring the hand movement of a human operator and the human operator's hand movement can be tracked by sensors on an immersive VR display worn by the human operator.

As an example, for a simulated remote environment, such as an AR or VR application, the computing system 52 can run the processes of the AR or VR application (e.g., from non-transitory memory using a processor) and/or connect the user of system 50 with other users of the same simulated remote environment. The user can control at least a portion of the simulated remote environment utilizing the XR device 12 (which may include physical gaming controllers and/or motion sensing capabilities) and/or the controller 14 (which may be connected to one or more sensors in the one or more sensory devices not shown in FIG. 5). Essentially, when the user moves in real life a virtual avatar of the user moves in a similar, or predetermined manner (e.g., a specific movement of the user makes something different happen in the game such as a wrist flick opens an in-application menu), within the simulated remote environment run by the computing system 52 and visualized through the display of the XR device 12. Actions within the simulated remote environment that effect the user can be visually fed back to the user through the computing system 52 and displayed on a display of the XR device and can be haptically fed back to the user through the game engine via the controller 14, as described in detail above utilizing the controller, a signal generator (not shown in FIG. 5), and one or more skin surface electrodes to create referred sensations at another location as haptic feedback. For example, the user can shake another user's hand in a simulated remote environment and feel that they are shaking hands. In another example, the user can be playing a game with a ball (e.g., basketball, football, four square, etc.) and can feel themselves catching and releasing the ball. In another example, the user can be driving a vehicle and can feel the vibrations of the steering wheel and the force feedback from the steering wheel on the user's hand. In another example, the user can interact with a physical game controller as well (e.g., a clicker, a racket, a fake sword, etc.) that is replicated in the virtual world as itself or another object. Due to the system described in detail above the user can feel natural sensations of these actions, not only, for example, vibrations or tingling or sharp pokes.

IV. Methods

Another aspect of the present disclosure can include methods for delivering surface electrical nerve stimulation to a nerve at or near a first area of a user's body (e.g., first location 22) to induce a second area of the user's body (e.g., second location 24) to experience a natural sensation as haptic feedback (e.g., referred sensation). The referred sensation is due to an afferent action potential transmission from a peripheral sensory nerve to the spinal cord and up to the brain, which perceives the action potentials as sensory information.

The methods can utilize a system (shown in FIGS. 1-5) to deliver surface electrical nerve stimulation at a first area of a user's body to induce a second area of the user's body to experience a natural sensation as haptic feedback (e.g., referred sensation). At least one step of the methods can be executed by at least one component that includes at least a processor.

For purposes of simplicity, the method is shown and described as being executed serially; however, it is to be understood and appreciated that the present disclosure is not limited by the illustrated order as some steps could occur in different orders and/or concurrently with other steps shown and described herein. Moreover, not all illustrated aspects may be required to implement the method, nor is the method necessarily limited to the illustrated aspects.

Referring now to FIG. 6, illustrated is a method 60 for delivering surface electrical nerve stimulation to a nerve at or near a first area of a user's body (e.g., first location 22) to induce a second area of the user's body (e.g., second location 24) to experience a natural sensation as haptic feedback. At step 62, an action and an intensity of the action occurring in a simulated remote environment can be received (e.g., by controller 14, which can be a microcontroller) from an XR device (e.g., XR device 12) and/or computing system. At step 64, one or more parameters for an electrical stimulation can be set (e.g., to provide a reflection of the nature, duration, location, and/or intensity of the action) (e.g., by controller 14) based on the action and the intensity of the action in the simulated remote environment or veridical environment. As an example, the parameters can include (but are not limited to) pulse width, frequency, amplitude, pulse shape, interpulse interval, recharge phase amplitude, recharge delay, etc. At step 66, the one or more parameters can be sent (e.g., by controller 14) to a signal generator (e.g., to signal generator 16) to configure the electrical stimulation. The signal generator (e.g., signal generator 16) generates the electrical stimulation signal comprising the parameters and sends the electrical stimulation signal to a skin surface electrode (e.g., one or more skin surface electrodes 18) to deliver the electrical stimulation signal to a nerve at or near a first location (e.g., first location 22) on a user's body to induce a second location (e.g., second location 24) on the user's body to experience a level of sensation in response to the action and the intensity of the action occurring in the simulated remote environment.

It should be noted that the first location and the second location need only be connected by a single nerve (e.g., the digital nerve), but may be connected by multiple neural structures in some instances. The same electrical signal or different electrical signals, or combinations thereof, can be sent to more than one skin surface electrode to elicit a referred sensation at more than one second location. This approach targets the nerves connecting the brain to the region where sensory receptors exist (e.g., on the fingertip) and as the stimulation activates those nerves from locations (e.g., along the finger), the brain associates the nerve activity with sensations that occur at the region(s) on the fingertip that those nerves are connected to even though the sensory receptors in those region(s) on the fingertip have not been activated by physical contact, force, or direct stimulation.

The action can occur in a simulated remote environment or a veridical environment. As shown in the method 70 of FIG. 7, at step 72, the simulated remote environment can be displayed (e.g., by XR device 12) and at step 74, information about the action and the intensity of the action can be sent to the controller (e.g., controller 14). As noted, the XR device and the controller can communicate through at least one device (e.g., computing system 52), which can engage in XR applications or veridical applications. The XR device can also display a veridical environment that is real, but physically remote from the user, and can send information about a real action and the intensity of the action at the physically remote location to the controller. The real action may be based on a command or action of the user via a robot or other machine at the remote location.

V. Examples

Figure 8:
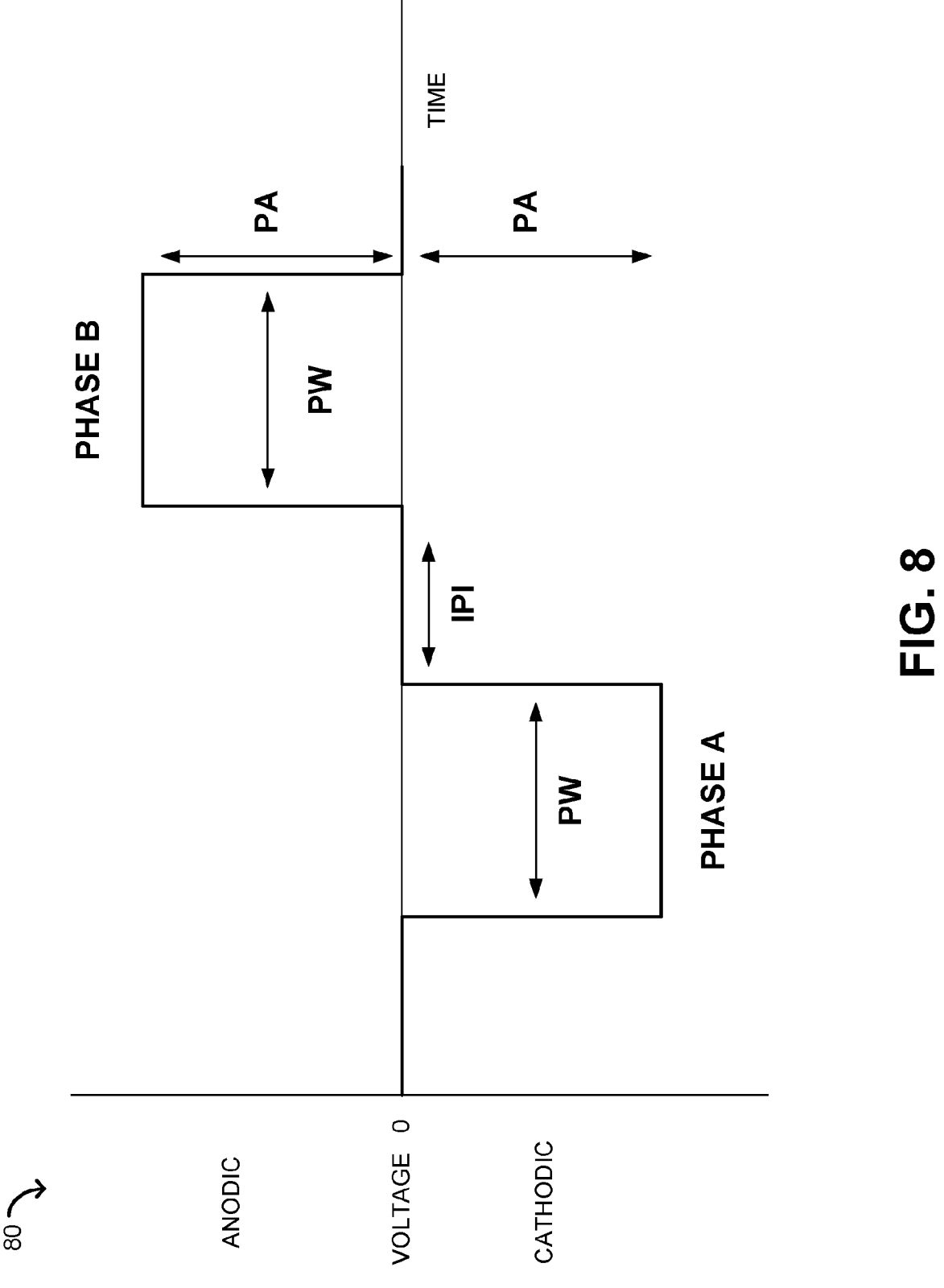
FIGS. 8 and 9 each illustrate an example electrical waveform that can be used in a stimulation to cause referred sensation
Figure 9:
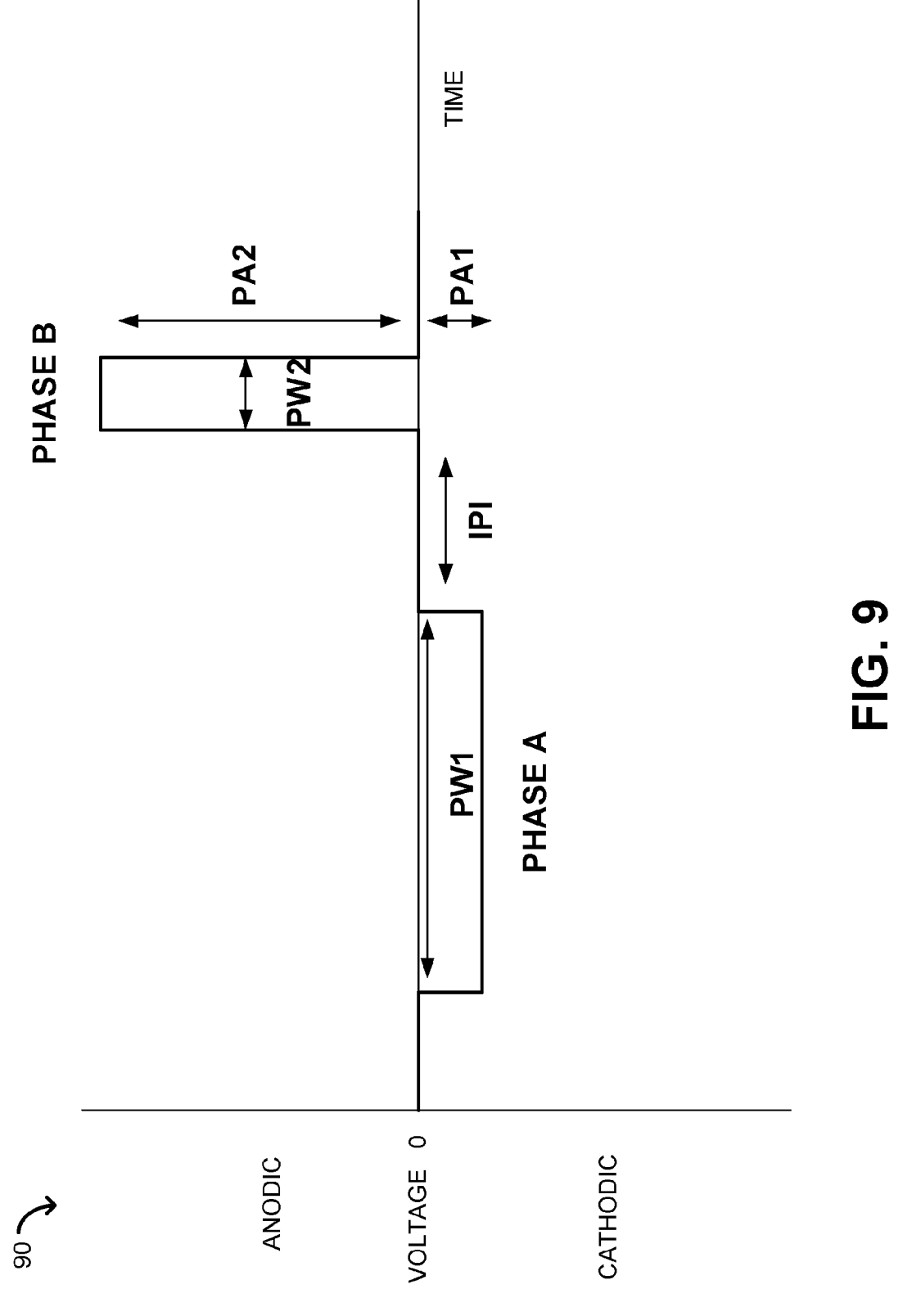

The following examples show different uses of the systems and methods described here. These examples are not intended to be limiting in any way and are merely intended to show how the systems and methods work in everyday life. As noted, in each of these examples, it is clear that the electrical stimulation is delivered to a nerve at a first location for a referred sensation to be felt at another location along the nerve rather than to a mechanoreceptor to directly sense the stimulation. Example waveforms that can be used to deliver the referred sensation are shown in FIGS. 8-9. However, it should be understood that different waveforms having a variety of waveform shapes, symmetry, and area (as long as the waveform is charge balanced) are possible.

The waveforms shown in each of FIGS. 8-9 are biphasic (with Phase A and Phase B) and charge balanced so that the area (charge) under the waveform for Phase A is the same as the area (charge) under the waveform for Phase B. FIGS. 8 and 9 are each example of charge balanced waveforms. As shown in FIG. 8. The waveform can be symmetric (Phase A has the same shape as Phase B), while as shown in FIG. 9, the waveform can be asymmetric (Phase A has a different shape than Phase B). The waveforms of FIGS. 8 and 9 each have a cathodic leading pulse (Phase A) and an anodic pulse (Phase B) thereafter. Variations can be introduced with modulation, such as changing the shape (e.g., triangle every other pulse instead of square), and the pulse frequency, pulse width (PW), pulse amplitude (PA), and/or interpulse interval (IPI) can be altered.

The electrodes can be positioned to target specific nerves. To avoid activating motor nerves that innervate muscles potentially causing a twitch, as an example, the electrodes can be placed after the wrist. One such location is the proximal phalanges of each finger. A distally-referred sensation can be generated on the corresponding fingertip due to the electrical stimulation creating an action potential on the digital nerve in the finger, which spreads in the efferent and afferent directions. The efferent action potential that goes toward the finger has no effect on the perceived sensations because dendrites of an afferent nerve can only receive signals (neurotransmitters) from the mechanoreceptors in the skin but cannot activate the mechanoreceptors. The afferent action potential goes from the peripheral nerve to the spinal cord and up to the brain. The nerves stimulated are sensory nerves (since there are no motor nerves at the locations of the active electrode), so the stimulated nerves exclusively carry sensory information from the mechanoreceptors. Therefore, when the brain receives action potentials from these nerves, the brain perceives the action potentials as sensory information from the mechanoreceptors (e.g., the brain is being tricked about the source of the action potentials). Another example can include placing the electrodes on the palm, which can lead to feeling sensations on multiple fingers because the nerves under the palm go to multiple fingers. A common return electrode can be placed far away from the electrode, such as applied to the user's elbow, to increase stimulation depth, increase the probability of a distally-referred sensation, limit the sensations to only the referred location, and/or avoid sensations wherever the return is placed.

Video Games

One example of utilizing the systems shown in FIGS. 1-5 is for video gaming purposes. For example, a user can wear or use an XR device (e.g., the headset display and any optional physical gaming controllers and/or sensors of the XR device) that either includes a computing system or is connected (wired and/or wirelessly) to a computing system (e.g., a gaming laptop, mobile device, etc. running a base application). As an example, communication can happen wirelessly between the XR device and the computing system (or controller), such as using different protocol(s) and carrier frequency(ies) through Bluetooth, Bluetooth Low Energy (BLE) and/or 915 MHz radio.

The user can also be wearing a reusable sensory device, such as the partial glove device shown in FIG. 4 and described in detail above, that secures one or more skin surface electrodes to the user's skin and can contain the controller and signal generator in communication with the XR device and/or the computing system. The sensory device may take other forms such as a partial arm sleeve, a wristband, a sock like device, or the like for sending referred sensation to different portions of the body. While playing the video game the sensory device can receive information (nature, duration, intensity, etc. of the action) from the XR device and/or the computing system regarding actions in the game that effect the user and convert those actions to haptic feedback at the fingertips, or other parts of the hand and/or body. The sensory device stimulates one or more nerves using one or more skin surface electrodes at first locations with one or more electrical signals configured based on the action in the game. The stimulations are configured to cause referred sensations at second locations along the one or more nerves as the haptic feedback (e.g., at the fingertips, or other part of the hand and/or body that are remote from the first locations but connected by the same nerve). Importantly, the haptic feedback felt by the user is a referred natural sensation based on the stimulation at the one or more first locations on the action occurring in the video game and the intensity of the action. In this way the user can feel what is happening (or a safe facsimile/approximation if the virtual action is too painful for a user in real life) in the game, making it much more realistic. The sensory devices are also noted for not blocking the user's freedom of movement and ability to interact with the real world, for example in AR gaming applications.

Telepresence

Telepresence is another exemplary use of the systems described with regards to FIGS. 1-5 to stimulate a nerve by a surface electrode at a first location with sensory stimulation and receive a referred sensation at a second location. For example, medical professionals can wear a reusable partial glove (shown in FIG. 4 or other sensory device 32) while performing physical diagnosis of a patient from a remote location. The glove may, for example, be in communication with a robot at the remote location having sensors and acting on the patient or in communication with a second glove having one or more sensors (pressure, accelerometer, gyroscope, IMU, temperature, etc.) and worn by the patient who is instructed on diagnostic movement and touches by the user (e.g., feeling for heartbeats, breathing, temperature, nodules, lumps, or the like). The medical professional can thus interact with the patient and make a diagnosis from a distance. Friends and loved ones separated by distances can engage in physical contact via the reusable partial glove (shown in FIG. 4 or other sensory device 32) such as a virtual hug or a handshake that the user(s) of the glove(s), or other sensory device, can actually feel. Another telepresence example is a user manipulating a machine (e.g., a drone, a plane, a car, etc.) and/or robotic avatar from a distance. Where the glove, or other sensory device, allows a user to receive natural sensation haptic feedback corresponding to actions of the machine and/or robotic avatar without interrupting the user's movements, e.g., allowing the user to make finite changes to the actions of the machine and/or robotic avatar and feel finite actions effecting the machine/robotic avatar. In this example, the sensory devices may be used to control the machine/robotic avatar as well via sensors included in the glove and/or attached to the user (e.g., force sensors, pressure sensors, gyroscopes, IMUs, accelerometers, or the like), or another control device may be used in conjunction with the glove (e.g., joystick, keyboard, steering wheel, etc.). Any sensations that would be unsafe/too painful for a user may also be dampened to a safe level of natural sensation.

Feedback Loop

A feedback loop can be used in any example described herein. An example of a feedback loop is the display of tactile information from tactile sensors mounted to the finger of a robotic hand, as well as simultaneously using neuromuscular electrical stimulation (NMES) to the wrist extensor and flexor muscles to display force information from a joint torque sensors embedded in the actuators of the robotic hand's wrist. The robotic hand's movement is controlled to mirror the hand movement of a human operator and the human operator's hand movement is tracked by sensors on an immersive VR display worn by the human operator. A video-game-based example is displaying tactile information that represents the vehicle vibration that travels through a steering wheel and simultaneously use force feedback from NMES to represent torque that the steering wheel exerts on the player's hand.

VI. Experimental

This experiment shows a study that evaluated surface electrical stimulation's ability to generate distally referred sensations in people without limb-loss, with the goal of eliciting sensations at the fingertip. The experiments of the study investigated the effects of electrode position, stimulation intensity, and stimulation polarity on perceived sensation location. The results showed that finger-palm electrode combinations were most likely to elicit distally-referred sensations. The position of the electrodes on the finger and palm in the circumferential or anteroposterior direction also impacted the perceived location of the distally-referred sensations, but there were no consistent trends across participants. It was found that the stimulation intensity also had statistically significant effects on sensation location: increases in stimulation intensity led to increases in the sensation area, proximal shifts of the percept centroid, and movement of the distal boundary of the percept to more distal locations. It was discovered that 71% of perceived sensations were not polarity dependent, and that a larger return electrode positioned on the elbow eliminated sensation located near the return electrode and reduced proximal sensations located on the palm.

Experiment One: Identify Electrode Combinations That Elicit Distally-Referred Index Finger Sensations Experiment One focused on the effects of interelectrode distance, electrode position and polarity on generating distally-referred sensations to the index finger.

Experiment One: Methods

Participants and Study Visits: Five able-bodied participants (two female, three male; age 28±6 years (mean±standard deviation)) performed the experiment in a single 3.5-hour long session. All participants provided written informed consent to participate in these experiments, which were approved by the Metro Health System Institutional Review Board. The research was conducted in accordance with the principles embodied in the Declaration of Helsinki and in accordance with local statutory requirements.

Stimulation System and Parameters: These experiments used an investigational grade stimulator custom designed at Case Western Reserve University. The stimulator can generate currents between 1 mA and 100 mA with a 1 mA resolution and pulse widths between 0 μs and 255 μs with a 1 μs resolution. The stimulator was controlled by a custom MATLAB Simulink model on a host computer for the selection of stimulation parameters. Disposable self-adhesive Ag|AgCl electrodes with a 1.8 cm diameter were connected to the stimulator. The stimulator generated a cathode first, charge balanced, current controlled, symmetric output square waveform. The stimulation was applied for five seconds at 90 Hz in order to generate continuous sensations.

Figure 10:
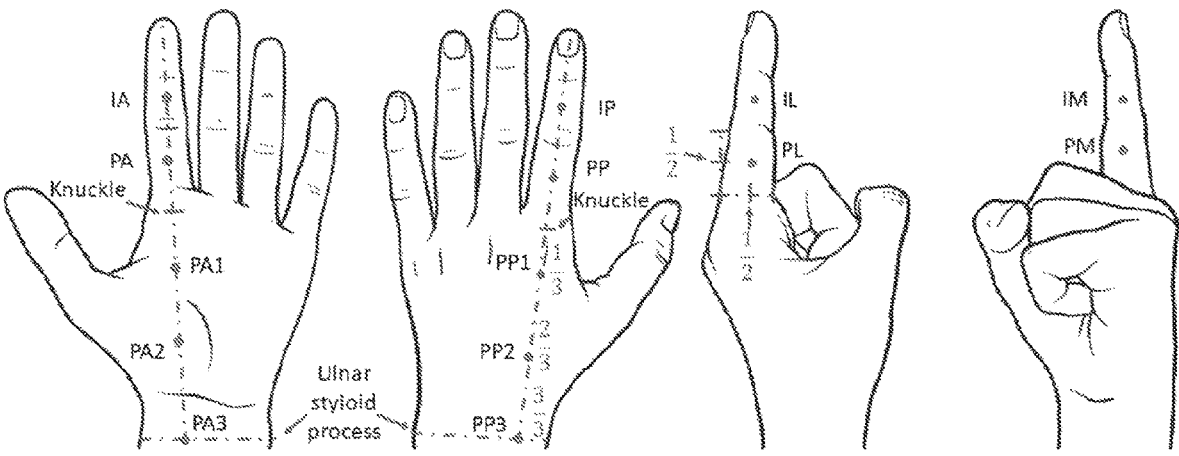
FIG. 10 is an illustration showing experimental electrode positions.

Identification of Possible Electrode Positions: At the beginning of each session, the participant's hands were prepped with TENS wipes. Each participant's left hand and index finger were divided into 14 regions (see FIG. 10), consisting of 8 regions in the index finger (IA, PA, IP, PP, IL, PL, IM and PM) and 6 regions on the palm (PA1, PA2, PA3 and PP1, PP2, PP3). These 14 regions, referred to subsequently as 'electrode positions', were placed close to the digital nerve branch of the median nerve that innervates the index finger. Each of the 8 regions on the finger were located at the center of either the intermediate or proximal phalanges on each of the faces of the finger (medial, lateral, posterior, and anterior). The distal phalange was not evaluated because it is the target location for the elicited sensation, and because it would not be possible to elicit sensation distal to it. In FIG. 10, the 14 electrode positions for Experiment 1 are indicated by dots. Positions on the finger were centered on the surface of the following phalanges: intermediate anterior (IA) and posterior (IP), proximal anterior (PA) and posterior (PP), intermediate lateral (IL) and medial (IM), and proximal lateral (PL) and medial (PM). Palm posterior (PP) and anterior (PA) positions were distributed 1/3 (PP1, PA1) and 2/3 (PP2, PA2) and 3/3 (PP3, PA3) of the distance from the knuckle to the horizontal plane of the ulnar styloid process A distally-referred sensation was defined as a sensation located distally from the most distal electrode position, so electrode positions on the distal phalange cannot elicit this type of sensation because they are on the most distal section of the finger. For the finger regions, the naming convention is a combination of the finger segment (intermediate or proximal phalange) and the face of the segment (anterior, posterior, medial, or lateral) described above. For example, the electrode positions on the proximal phalange's lateral face is the PL electrode position (see FIG. 10). The six palm electrode positions were defined while the participant's hand was laid on a flat surface and a guideline was drawn through the center of the finger on the posterior side of the hand. The distance along this guideline from the knuckle to a horizontal line running through the Ulnar styloid process was measured, and a point was placed every third of the distance (see FIG. 10). The same process was repeated for the anterior side of the hand. In the naming convention for the palm electrode positions, the first letter is always P for palm, the second letter stands for the side of the palm (anterior or posterior), and the number is the distance from the finger in terms of thirds.

To ensure the electrode positions were consistent throughout the study, each of these positions was marked on the participant's hand using a skin-safe marker. This methodology ensured repeatability across participants regardless of hand size by using anatomical landmarks. Each electrode position can have both polarities (active and return), so a total of 182 (14×13) electrode position combinations were evaluated (referred to subsequently as electrode combinations).

Assessing Electrode Combinations: Participants were first asked to find their maximum comfortable limit. To ensure that each participant's maximum comfortable limit was less than 255 μs (maximum pulse width of the stimulator), the pulse amplitude was set higher (15 mA) than the 3 mA amplitude that was reported in the literature to have elicited sensations. Each participant was asked to control pulse width using the scroll wheel of a computer mouse, so they could limit exposure to pulse widths that produced uncomfortable sensations. Participants were then instructed to find the discomfort threshold by increasing pulse width until discomfort was felt, and then to immediately decrease pulse width to find the highest pulse width that produced comfortable sensation without discomfort. The simulation was turned on for five seconds at a time to avoid possible desensitization. To make sure the participant had enough time to adjust the pulse width and judge the sensation, additional 5-second stimulation trains were applied if necessary. To minimize variability related to electrode reapplication, each electrode combination was assessed for both polarities without moving the electrodes. Additionally, one of the electrode positions was kept constant while the other was repositioned to the 13 other electrode positions. This process was repeated a total of 14 times to cover all 182 different electrode combinations. The electrodes were replaced as necessary throughout the session to ensure adequate adhesion of the electrode to the skin.

The participant was asked three questions for each stimulus: 1) Is the sensation distal to the electrode position (yes or no)? 2) Is the sensation comfortable (yes or no)? and 3) Do you feel any muscle contraction from the stimulation (yes or no)? Prior to beginning the experiment, the researcher clarified the instructions with the participant and the participant was able to ask questions to improve understanding. Only electrode combinations in which the participant answered 'yes' to both questions 1 and 2 and 'no' to question 3 were classified as "useful" sensations and were selected for further analysis.

Statistical Analyses: To compare different electrode positions and combinations, the data was averaged across all five participants. When comparing across different polarity conditions, data was average across participants to assess different electrode combinations and averaged across electrode combinations to assess differences between participants. The polarity data was assessed for normality using a quantile-quantile (Q-Q) plot and histograms, but the data did not fit a normal distribution. Therefore, a non-parametric test, Kruskal-Wallis rank sum test, was used to investigate if there was a significant difference among polarity conditions. A post-hoc pairwise comparison was run using Dunn's Test for multiple comparisons with a Bonferroni adjustment.

Experiment One: Results

Data was pooled across participants and trials to determine how electrode position impacted the frequency of reports of useful sensations. As shown in FIG. 11, Average percentage and standard deviation of useful trials (11a) for each electrode position relative to the total number of trials where the specific electrode was used across all participants (n=130 per electrode position) and (11b) for each electrode combination relative to all the trials where electrodes were positioned on the positions described by the combination (e.g. finger and palm) across all participants (n=280 finger-finger, n=480 finger-palm, n=150 palm-palm) The top half electrode positions that were most often associated with a useful classification, in descending order (from most frequently useful to least frequently useful), were PA1, IL, IA, PL, IM, IP, and PA (see FIG. 11, element a). The electrode positions that were least often associated with a useful classification were PA3, PP3, PP, PP2, PA2, PM, PP1 in ascending order (from least frequently useful to most frequently useful). Most of the least useful electrode positions were proximal palm electrode positions (5/7). When looking at the different types of electrode combinations, 68% (n=480) of the trials with finger-palm electrode combinations (one electrode position in the palm and one in the finger) were classified as useful (see FIG. 11, element b). In contrast, only 23% (n=150) of the palm-palm electrode combination trials were classified as useful. The top three electrode positions on the palm were PA1, PP1, and PA2, and the top three finger electrode positions were IL, IA, and PL. Based on these results, fingerpalm combination with a proximal palm electrode and a finger could elicit distally-referred sensation. The finger-palm combinations using the top three finger and palm electrodes were as follows (n=10 for all) IAPA1 (100% useful), IL-PA1 (100% useful), PL-PA1 (90% useful), IA-PP1 (90% useful), IL-PP1 (100% useful), PL-PP1 (90% useful), IA-PA2 (90% useful), IL-PA2 (100% useful), PL-PA2 (70% useful). Also, the positions of both the active and return electrode can affect the presence of distally-referred sensations.

For a given electrode combination, there are two possible arrangements that depend on the relative positions of the active and return electrodes. For example, a given finger-palm electrode configuration can have the active electrode positioned on the palm with the return on the finger, or vice versa. The difference between these two arrangements is polarity. FIG. 12, elements (a) and (b), shows the polarity dependent average percentage and standard deviation relative to the total useful trials for (12a) each electrode combination averaged across participants (n=280 finger-finger, n=480 finger-palm, n=150 palm-palm) and (12b) for each participant averaged across electrode combinations (n=182 per participant). The legend specifies the polarity configuration and the relative position of electrodes to each other. The third bar (orange) refers to conditions where both electrodes were equidistant from the wrist per FIG. 10.

On average, participants reported 71% (n=910) of the perceived sensations were polarity independent (PI) across all electrode combinations (see FIG. 12, element a). There was a significant difference between different polarity conditions (Kruskal-Wallis rank sum test, p<0.001). The post hoc analysis revealed there was a statistically significant difference between PI trials and the polarity dependent conditions (Dunn (1964) Kruskal-Wallis multiple comparison: PI vs. Cathodic on distal, p<0.001; PI vs. Cathodic on proximal, p=0.029; PI vs. same phalange, p<0.001). For polarity dependent trials, there was no clear pattern across finger-finger and finger-palm electrode combinations. However, for palm-palm electrode combinations, a greater number of useful sensation trials were reported when the active electrode was the most distal electrode position (i.e., the cathodic-leading pulse was provided to the most distal electrode of the pair). There was no significant difference among the polarity dependent conditions (Dunn Kruskal-Wallis multiple comparison: Cathodic on distal vs. Cathodic on proximal, p=0.90; Cathodic on distal vs. same phalange, p=1.00; Cathodic on proximal vs. same phalange, p=0.74). When looking at similarities within participants, must participants showed little polarity dependence, except for participant three (see FIG. 12, element (b)). When looking at the polarity dependence within participants, most of these polarity dependent useful trials occurred when the leading pulse on the most distal electrode position was cathodic.

Experiment Two: Effect of Stimulation Parameters and Electrode Position on Distally-Referred Sensations In Experiment Two, a subset of electrode positions that most frequently elicited useful distally-referred sensations (based on the results of Experiment One) were examined more rigorously and in a larger number of participants. The goal of Experiment Two was to characterize how the location of distally-referred sensations at the index finger can change when the stimulation intensity varied between the perception threshold and the maximum comfortable limit.

Experiment Two: Methods

Participants and Study Visits: Twelve participants were recruited, but one participant did not complete the study. The remaining eleven participants (three female, eight male; age 30±14 years) participated in one three-hour session, followed by two 2.5-hour sessions. All participants provided written informed consent to participate in these experiments, which were approved by the Metro Health System Institutional Review Board. The research was conducted in accordance with the principles embodied in the Declaration of Helsinki and in accordance with local statutory requirements. Sensation locations were evaluated for nine electrode combinations.

Selection of the Nine Electrode Combinations: During Experiment One, two participants reported during multiple trials that they perceived sensations located near the electrode positions on the palm. These sensations were outside the index finger area, so the participants were instructed to classify all trials with sensations located on the palm as not useful. Similar instances could have affected useful rates for combinations with electrodes on the palm. It is hypothesized that return electrode size, inter-electrode distance, and distance from underlying nerves can increase stimulation threshold selectively at the return electrode size, so one of the top three return electrodes was replaced with a five centimeter electrode placed over the olecranon process (elbow electrode). The nine electrode combinations for Experiment Two consisted of all the possible combinations between three finger locations (IA, IL, PL) and three non-finger locations (PA1, PP1, Elbow). The electrode positions were selected based on the three most useful finger electrodes and three most useful palm electrodes, with the elbow electrode replacing PA2 (see FIG. 11).

Nine electrode combinations were evaluated: IAPA1, IL-PA1, PL-PA1, IA-PP1, IL-PP1, PL-PP1, IA-Elbow, IL-Elbow, PL-Elbow. Only one polarity orientation was investigated for each combination, in which the active electrode was the most distal electrode position. This polarity was chosen because FIG. 12 showed that the majority of the trials in Experiment One did not have polarity dependence, and when they did, they were more likely to be reported as useful when the distal electrode was the active electrode.

Preparation: To ensure the electrode positions were consistent with those in Experiment One and repeatable across sessions, they were identified and marked using the same process described in "Experiment One: Methods".

Parameter Search: Sensation locations were evaluated at two different pulse widths, perception threshold and maximum comfortable limit. The pulse widths corresponding to perception threshold and maximum comfortable limit were recorded at five different pulse amplitudes (2, 3, 7, 15, and 30 mA).

To find the perception threshold, parameter estimation by sequential testing (PEST) methodology was used to reduce participant sensory response variability. The PEST method consists of starting with a subthreshold stimulus and increasing the pulse width by a fixed step size in an ascending staircase until a sensation is reported, followed by decreasing pulse width in a descending staircase until the sensation disappears. This process was repeated until five reversals were recorded. With each reversal, the step size decreases until 1 μs step size is reached (the minimum pulse width step size for the stimulator). The pulse width step sizes used on each reversal were 20, 10, 5, 2, and 1 μs.

The maximum comfortable limit was defined as the maximum pulse width before sensation becomes uncomfortable, which was defined as the feeling of slight pain or physical discomfort. Furthermore, participants were instructed not to confuse uncomfortable with unnatural because this experiment was not intended to evaluate sensation quality or naturalness. In addition, participants were instructed not to confuse intensity with the level of uncomfortable sensations, because some sensations could be strong but still comfortable, while others may be very weak but uncomfortable. To find this threshold, the participant increased pulse width by one μs using a mouse scroll wheel until sensation became uncomfortable. The participant then immediately decreased pulse width until the sensation was comfortable again. There were no reversals on this process to minimize re-exposing participants to uncomfortable sensations.

Sensation Location Evaluation: After determining the stimulation pulse widths associated with perception threshold and the maximum comfortable limit at each of the five pulse amplitudes, the pulse amplitude value with the highest dynamic range (PWmax-PWperception) was selected for further evaluation. The perception threshold and maximum comfortable limit were re-evaluated at this selected pulse amplitude prior to further experimentation because changes in thresholds over a short time were observed during the exploratory trials in Experiment One. The perception threshold and maximum comfortable limit were each evaluated with a psychometric intensity test (PIT) form (see FIG. 13, element (b) as an example). In each test, the user reported the location of the sensation by coloring in an outlined illustration of a hand using up to five different colors to report up to five different sensation intensities.

To analyze sensation locations reported by participants, the sensation location centroid and borders were calculated. Due to discontinuities in the x-axis between fingers and the complex three-dimensionality of the fingers, 2D metrics like centroids and bounds were not suitable for evaluating sensation patterns on the x-axis as drawn on the PIT forms. Therefore, the y-axis patters were evaluated numerically, and the x-axis patterns were valuated visually. To analyze the patterns on the y-axis, the vertical centroid was calculated by averaging the y-axis distance of every colored pixel with reference to the center of the proximal phalange, which was the most proximal active electrode position. The proximal and distal bounds were the most distal and proximal aspects of each trial's sensation location. Their y-axis distances were calculated the same way as the vertical centroid. To give a numerical summary across different participants, the vertical centroid, proximal bound, and distal bound were averaged across all participants.

To evaluate the patterns of the perceived sensations along the x-axis, the PIT forms from different participants were superimposed with the other participants for that same electrode combination. Superimposing all percepts regardless of reported intensity might be misleading since a sensation in the desired place might have been reported, but its intensity might have been minimal while the most intense sensations would be on a proximal area of the finger, the palm, or another finger. Two superimposed outputs were created in order to show the patterns for all the sensations reported, as well as only the sensations that the participant reported as the most intense sensation during each trial.

Statistical Analyses: To analyze the effect of stimulation intensity on the sensation location, the various metrics used to evaluate sensation location (centroid, most distal sensation, most proximal sensation, and envelope size) were averaged across all participants and electrode combinations. The data was assessed for normality using a Q-Q plot and histograms, but the data did not fit a normal distribution. Therefore, a nonparametric paired difference test, Wilcox signed-rank test, was used to evaluate if stimulation intensity affected each of the different metrics. To evaluate if electrode combinations had an effect in sensation location metrics at different stimulation intensities, a nonparametric repeated measure test, Friedmann's test, was used.

Experiment Two: Results

Figure 13:
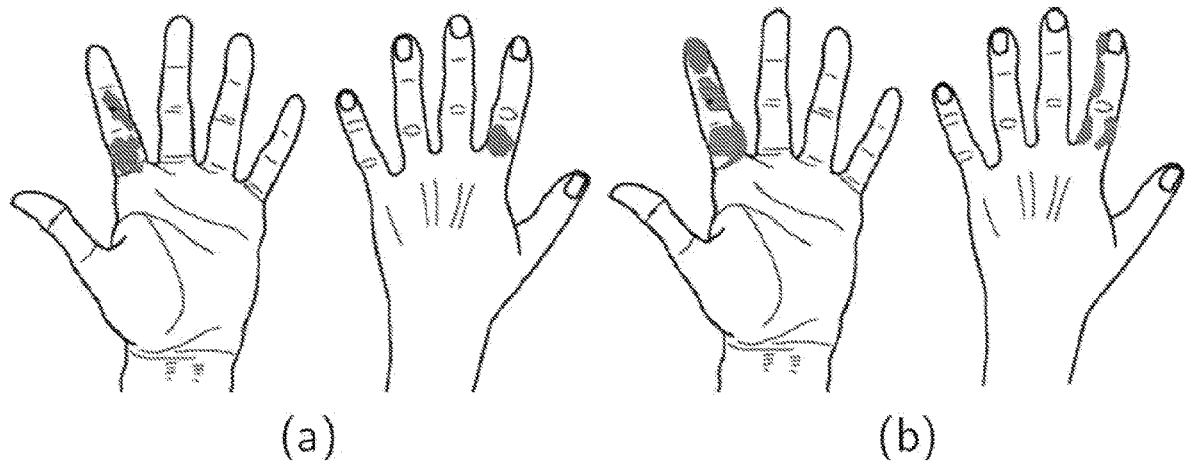
FIG. 13 is an illustration of example sensation locations for a subject.

Sensation location centroids and envelopes: FIG. 13 shows an example PIT form reported by participant four for the IA-elbow electrode combination, with different colors representing the intensity of perceived sensation in different areas. FIG. 13, element (a) shows sensation locations for the perception threshold and FIG. 13, element (b) shows the maximum comfortable limit when the active electrode was in the IA and the return electrode was on the elbow. Purple represents the most intense percept, and pink the next most intense percept. On average, participants reported two different intensities, and the maximum number of reported intensities per trial were three. At the maximum comfortable limit, the perceived sensation area changed, as shown by the differences between FIG. 13, elements (a) and (b). This illustrates that changes in the sensation's locations could be elicited by changes in stimulation pulse width and that the sensation area can expand and move in the distal-proximal direction with greater stimulation intensity.

Figure 15:
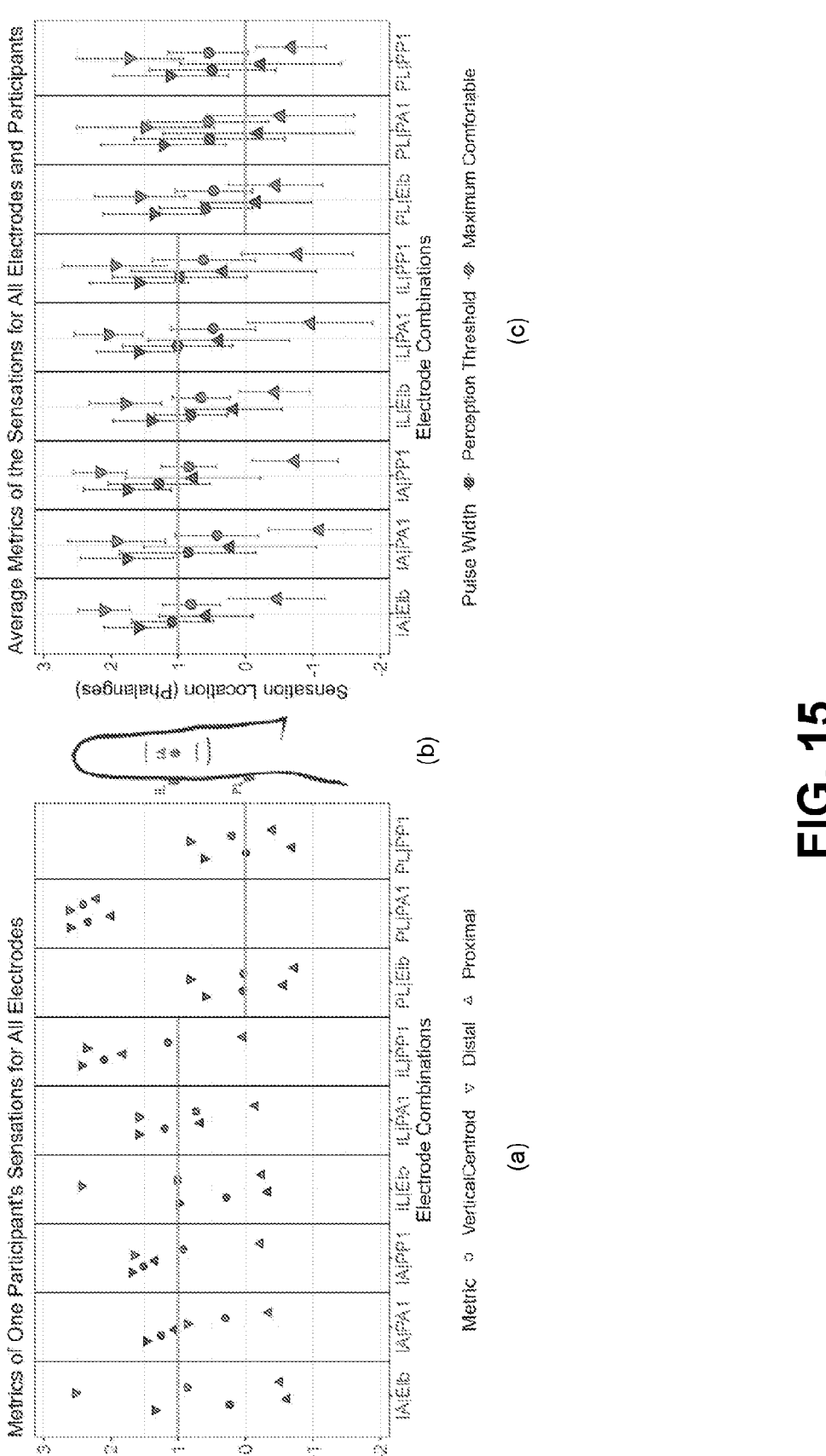

Three metrics were calculated to describe the spatial extent of the perceived sensory locations. All metrics are relative to the long axis of the finger (or the y-axis). For each trial, the percept centroid is the average y-axis position, the distal boundary is the most distal y-axis position, and the proximal boundary is the proximal y-axis position (see FIG. 15, element a). The distance between the proximal and distal boundaries (referred to as the envelope) increased as stimulation intensity was increased from the perception threshold to the maximum comfortable limit (see FIG. 15, element a). This increase in percept size with increasing stimulation intensity occurred for all electrode combinations, except for the PL-PA1 electrode combination. Furthermore, four of the nine electrode combinations for participant four showed distally referred sensations, which were defined as when segments of the sensations were located at least one phalange away from the active electrode in the distal direction. These distally referred sensations were all located on the fingertip between 1.5 to 2.7 phalanges distal to the active electrode. FIG. 15, elements (a), and (c), shows the vertical location of the percept centroid (circle), distal boundary (downward triangle), and proximal boundary (downward triangle) in units of finger phalanges from the psychometric intensity test (PIT) forms. The color to the left (blue) represents percepts reported at the perception threshold pulse width, and the color to the right (red) represents percepts reported at the maximum comfortable limit. The orange horizontal line marks the position of the active electrode for each electrode combination. FIG. 15, element a shows participant four's results, FIG. 15, element (b) shows the PIT form's index finger that has been scaled to the axes in (a) and (c) to display the IL, IA, and PL electrode positions relative to the orange lines, and FIG. 15, element c shows the average centroid and bounds across participants with standard deviation depicted by the error bars (n=11 per electrode combination and stimulation intensity).

Figure 14:
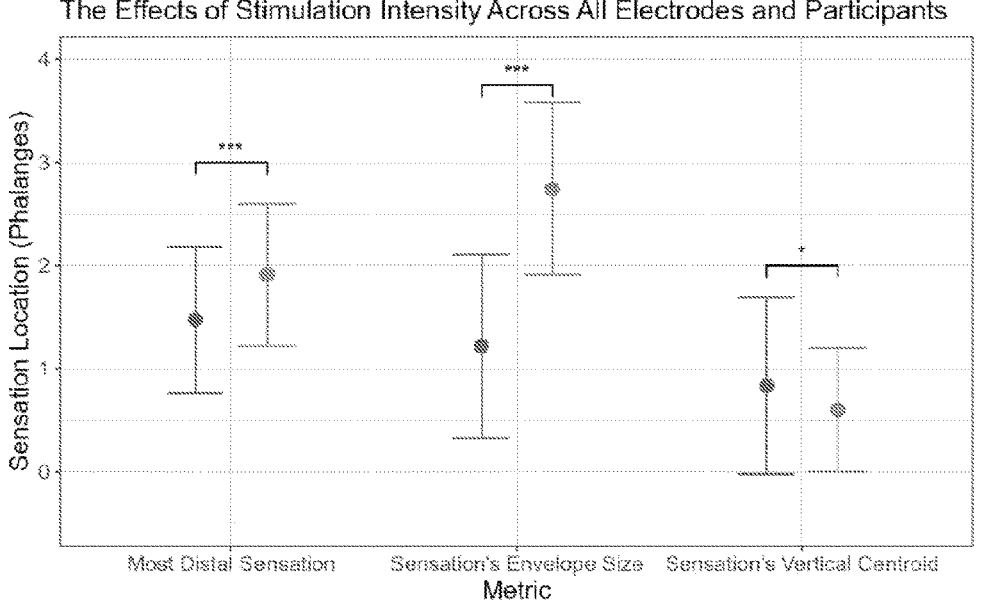
FIGS. 14 and 15 show graphical representations of experimental results.

Across all participants, the centroid migrated significantly more proximally (Wilcox signed-rank test, p=0.028), the distal boundary migrated to a significantly more distal location (Wilcox signed rank test, p<0.001), and the envelope (percept) size significantly increased (Wilcox signed-rank test, p<0.001) for all nine electrode combinations when stimulation intensity increased (see FIG. 14). In addition, electrode combinations that included the elbow for the return electrode had more proximally located proximal boundaries at the maximum comfortable limit. However, the average centroids (Friedmann's tests, p=0.09 for perception threshold, p=0.71 for maximum comfortable limit), distal boundaries (Friedmann's tests, p=0.05 for perception threshold, p=0.09 for maximum comfortable limit), and proximal boundaries (Friedmann's tests, p=0.09 for perception threshold, p=0.26 for maximum comfortable limit) were not statistically different between the nine electrode combinations.

Figure 16:
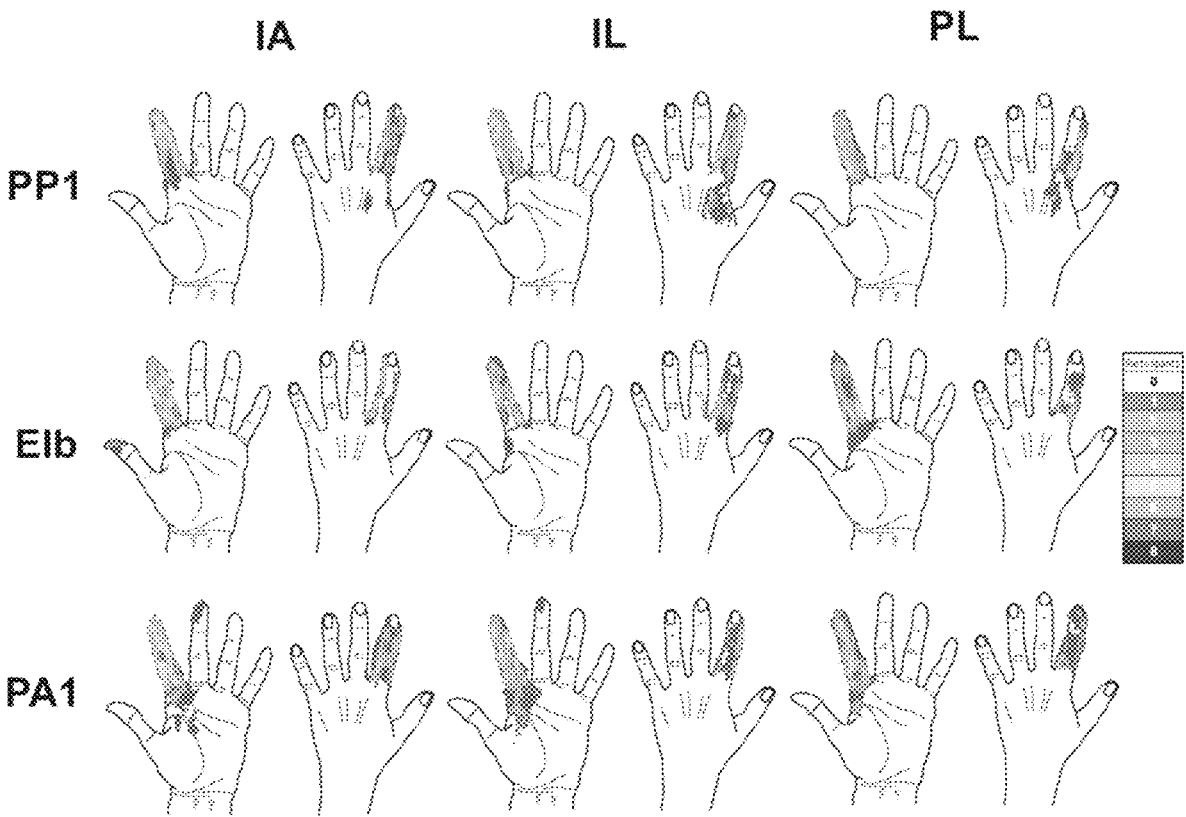
FIGS. 16 and 17 are illustrations showing percept locations results.

FIG. 14 shows the effects of stimulation intensity across all electrodes and participants. The forms to the left represent percepts reported at the perception threshold pulse width, and the forms to the right represent percepts reported at the maximum comfortable limit. The x-axis shows different metrics comparing the effect of stimulation intensity on sensation location. The most distal sensation is the distance of the most distal aspect of each sensation from the center of the index proximal phalange. The envelope size is the vertical distance between the most distal aspect and the most proximal aspect of each sensation. The vertical centroid is also measured from the center of the index proximal phalange. The y-axis uses finger phalanges as a normalized distance measurement. The point denotes the mean across all electrode combinations and participants, and the errors bars show standard deviation (n=99 per stimulation intensity on each metric). The statistical significance was calculated using Wilcoxon signed-rank test. The data separated by electrode combination is shown in FIG. 15, element c. Evaluating Sensation Location Drawings:

FIG. 16 superimposes the sensation locations drawn on the PIT forms at the maximum comfortable limit across participants, where redder areas (7 and 8 on the scale) indicate a higher frequency of reports. Sensation locations are shown without differentiating by perceived intensity level reported within trials. The sensations reported across participants and all electrode combinations were concentrated on the index finger (brighter colors (e.g., 3-6 on the scale) on the index finger compared to the palm and other fingers). Only three out of the nine combinations reported sensations on another finger other than the index, and these other fingers (thumb and middle) were adjacent to the index finger somatotopically. Electrode combinations with PA1 and PP1 return electrodes also tended to generate sensations that spread to proximal areas of the palm. In contrast, electrode combinations with an elbow return caused fewer participants to experience sensations in the palm. These results agree with the differences observed between the proximal boundaries of the vertical envelopes based on electrode configuration shown in FIG. 15, element c. Sensations outside the index finger area were only reported by one or two participants for each electrode combination. In total, 37% of the trials (n=99) had sensation outside the targeted finger. Electrode combinations that included an IA active electrode produced sensation locations that were approximately evenly distributed along all three phalanges of the index finger.

Figure 17:
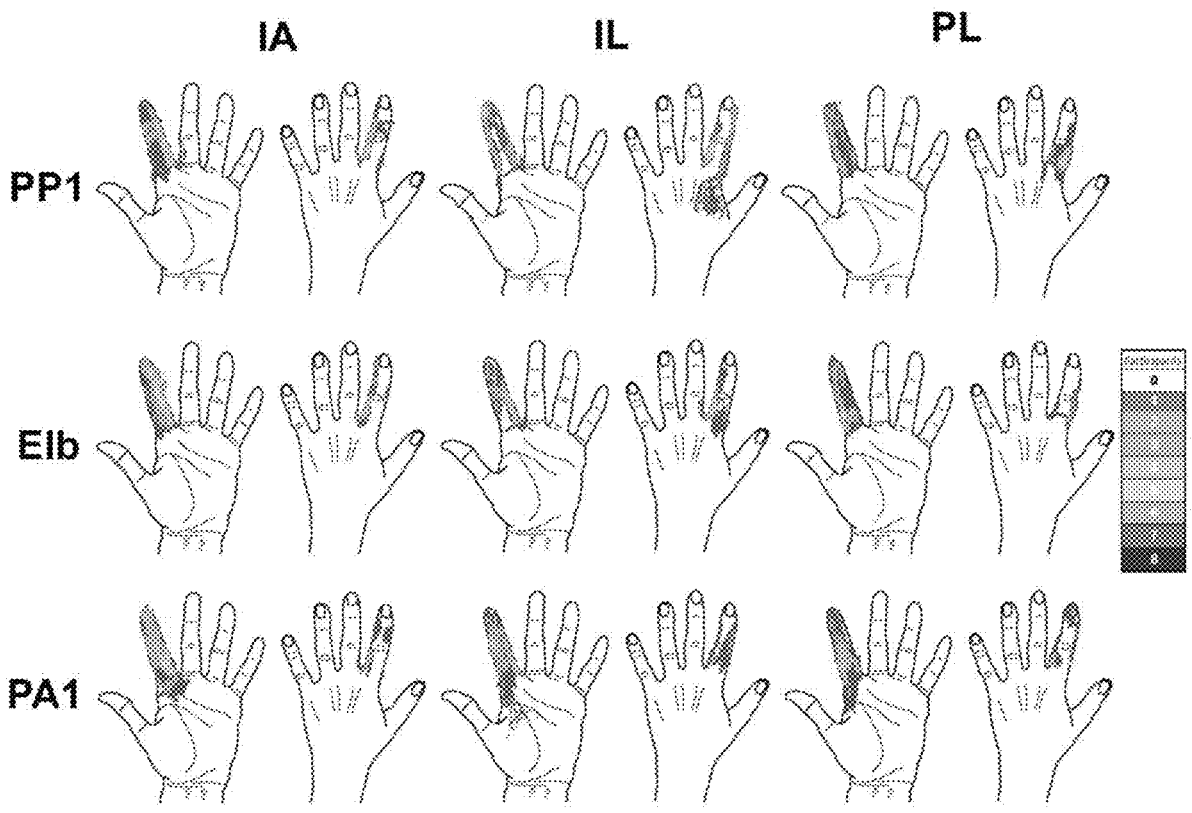

FIG. 17 superimposed the reported sensation location for only the most intense sensation reported in each trial across trials and participants. Data is shown for the trials of maximum comfortable limit only. Most of the percepts reported across all electrode combinations were focused on the index finger. Compared to FIG. 15, element c, the most intense sensation reported on each trial was only on the targeted finger. More importantly, all electrode combinations elicited a distally-referred sensation in the index fingertip at the most intense stimulus levels in each trial.

27

Figure 18:
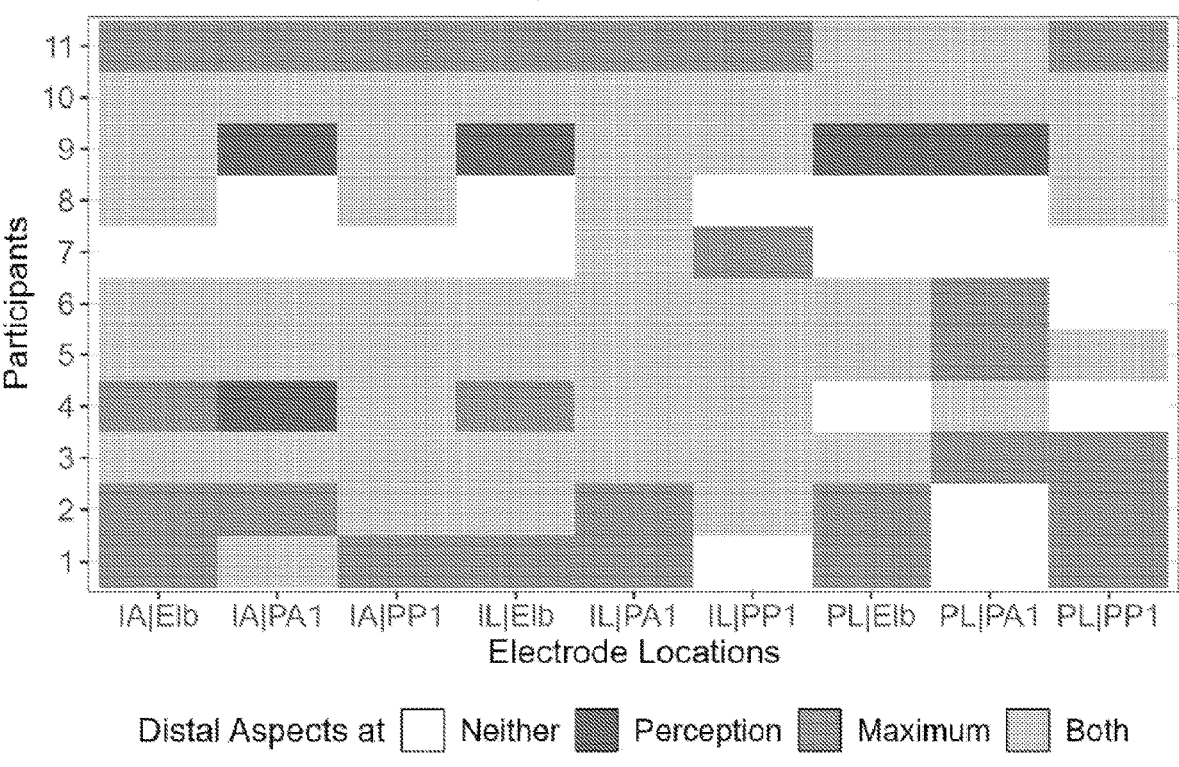
FIG. 18 shows a graphical representation of experimental results.

FIG. 18 shows which electrode combinations generated a distally-referred sensation for each participant at perception threshold, maximum comfortable limit, or both. At least one of the electrode combinations successfully generated distally-referred sensations at both perception threshold and maximum comfortable limit for all participants (see FIG. 18). Furthermore, some participants reported distally-referred sensations for most of the tested combinations (mean=7.4 combinations, min=2 combinations, max=9 combinations). Also, the IL-PA1 electrode combinations generated distally referred percepts for all participants for at least one of the evaluated pulse widths. When comparing active electrodes and return electrodes, only the PL electrode position reported fewer distally-referred sensations than the other active electrodes positions. Comparing across participants and electrode combinations, 18% of the trials did not include a distally-referred sensation, 4% of the trials elicited a distally-referred sensation at perception threshold only, 25% of the trials elicited a distally-referred sensation at the maximum comfortable limit only, and 53% of the trials elicited a distally-referred sensation at both stimulation levels (n=99). Thus, reports of distally-referred sensation were more common at the maximum comfortable limit compared to perception threshold, though reports of distally-referred sensation at both levels were by far the predominant response.

From the above description, those skilled in the art will perceive improvements, changes, and modifications. Such improvements, changes and modifications are within the skill of one in the art and are intended to be covered by the appended claims.

The invention claimed is:

1. A system comprising:
a signal generator configured to generate an electrical stimulation comprising parameters; and
a plurality of skin surface electrodes, each coupled to the signal generator, each configured to be placed at one of a plurality of first locations on a user's body remote from a plurality of second locations on the user's body,
a controller, in communication with the signal generator, configured to:
set the parameters for the electrical stimulation based on an action occurring in a simulated environment and an intensity of the action occurring in the simulated environment,
determine which of the one or more skin surface electrodes of the plurality of skin surface electrodes the signal generator should send the electrical stimulation to based on the action occurring in the simulated environment and the one of the plurality of second locations the action occurring in the simulated environment effects, and
apply via the signal generator
the electrical stimulation with the parameters to the one or more skin surface electrodes configured to be placed at the one of the plurality of first locations at or near a nerve that induces the user's body to experience a level of natural sensation at the one of the plurality of second locations in response to the action occurring in the simulated environment and the intensity of the action occurring in the simulated environment.

2. The system of claim 1, further comprising an extended reality (XR) device configured to be worn by the user to display visual information related to the simulated environment and to communicate the intensity of the action to the controller.

3. The system of claim 2, wherein the XR device is a head-mounted XR device.

4. The system of claim 1, wherein the plurality of skin surface electrodes each configured to be positioned at the one of the plurality of first locations on the user's body is configured to apply the electrical stimulation to the nerve associated with a sensation at the one of the plurality of second locations.

5. The system of claim 4, wherein the one of the plurality of second locations comprises an area affected by the action in the simulated environment.

6. The system of claim 4, wherein the plurality of skin surface electrodes are part of a glove that does not obstruct the plurality of second location on the user's body, wherein the plurality of first locations on the user's body are on a wrist, a palm, an elbow, a forearm, and/or a hand.

7. The system of claim 1, wherein the level of natural sensation is due to the electrical stimulation leading to sensory feedback.

8. The system of claim 1, wherein the parameters are two or more of current amplitude, pulse width, and frequency.

9. The system of claim 1, wherein the controller is further configured to change the parameters when the action or the intensity of the action changes.

10. The system of claim 1, wherein the plurality of first locations on the user's body are located near at least one sensory nerve fiber, wherein the nerve comprises the at least one sensory nerve fiber.

11. A device configured to cover at least a portion of a user's wrist, palm, elbow, forearm, and/or hand, the device comprising:
a plurality of skin surface electrodes each configured to be positioned at one of a plurality of first locations on the user's wrist, palm, elbow, forearm, and/or hand, each at or near a nerve, and to apply an electrical simulation having parameters to the at least one nerve at or near the one of the plurality of first locations to induce one of a plurality of second locations on the user's fingertips to experience tactile feedback in response to an occurrence of an action and an intensity of the action in a simulated environment, wherein each of the plurality of skin surface electrodes are coupled to a signal generator that sends the electrical stimulation with the parameters to the plurality of skin surface electrodes, which is coupled to a controller that defines the parameters and determines which of the plurality of skin surface electrodes the electrical stimulation should be applied to based on the action; and
a securing means configured to secure the surface electrode to the user's wrist, palm, elbow, forearm, and/or hand.

12. The device of claim 11, wherein the device is reusable.

13. The device of claim 11, wherein the plurality of skin surface electrodes are arranged in a predefined electrode configuration at the plurality of first locations on the user's wrist, palm, elbow, forearm, and/or hand, wherein each of the plurality of first locations is determined to induce feedback at one of the plurality of second locations on the user's fingertips when the electrical stimulation is applied.

14. The device of claim 11, wherein the device is a glove that is configured not to impede the user's interaction with real objects for extended reality purposes.

15. The device of claim 11, wherein the parameters are two or more of current amplitude, pulse width, and frequency.

16. A method comprising:

receiving, by a controller, an action and an intensity of the action occurring in a simulated environment;

setting, by the controller, parameters for an electrical stimulation based on the action and the intensity of the action;

determining, by the controller, one or more skin surface electrodes of a plurality of skin surface electrodes that the signal generator should send the electrical stimulation to based on the action occurring in the simulated environment and a location of the action occurring in the simulated environment, and sending, by the controller, the parameters for the electrical stimulation to a signal generator, wherein the signal generator generates the electrical stimulation signal comprising the parameters and sends the electrical stimulation signal to the one or more skin surface electrode of the plurality of skin surface electrodes, each at one of a plurality of first locations on a user's body, to deliver the electrical stimulation signal to a nerve at or near one or more of the plurality of first locations on the user's body to induce one or more of a plurality of second locations on the user's body to experience a level of sensation in response to the action, the location of the action, and the intensity of the action occurring in the simulated environment.

17. The method of claim 16, further comprising:

displaying, by an extended reality (XR) device, the simulated environment; and sending, by the XR device, the action and the intensity of the action to the controller.

18. The method of claim 16, wherein the parameters are two or more of current amplitude, pulse width, and frequency.

* * * * *